US010264642B2

(12) United States Patent
Liang et al.

(10) Patent No.: US 10,264,642 B2
(45) Date of Patent: *Apr. 16, 2019

(54) SYSTEMS AND METHODS FOR INTELLIGENT CONTROL RELATED TO TRIAC DIMMERS BY USING MODULATION SIGNALS

(71) Applicant: GUANGZHOU ON-BRIGHT ELECTRONICS CO., LTD., Guangzhou (CN)

(72) Inventors: Yuhao Liang, Guangzhou (CN); Yimu Liao, Guangzhou (CN); Zhiliang Chen, Shanghai (CN)

(73) Assignee: Guangzhou On-Bright Electronics Co., Ltd., Guangzhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/836,478

(22) Filed: Dec. 8, 2017

(65) Prior Publication Data

US 2018/0110104 A1    Apr. 19, 2018

Related U.S. Application Data

(63) Continuation of application No. 15/364,100, filed on Nov. 29, 2016, now Pat. No. 9,883,561.

(30) Foreign Application Priority Data

Oct. 17, 2016  (CN) .......................... 2016 1 0906129

(51) Int. Cl.
*H05B 33/08* (2006.01)
*H05B 37/02* (2006.01)

(52) U.S. Cl.
CPC ....... *H05B 33/0845* (2013.01); *H05B 33/083* (2013.01); *H05B 33/0803* (2013.01);
(Continued)

(58) Field of Classification Search
CPC ............ H05B 33/0803; H05B 33/0809; H05B 33/0815; H05B 33/0887; H05B 33/0845;
(Continued)

(56) References Cited

U.S. PATENT DOCUMENTS

| 3,803,452 A | 4/1974 | Goldschmied |
| 3,899,713 A | 8/1975 | Barkan et al. |

(Continued)

FOREIGN PATENT DOCUMENTS

| CN | 1448005 A | 10/2003 |
| CN | 101657057 A | 2/2010 |

(Continued)

OTHER PUBLICATIONS

China Patent Office, Office Action dated Aug. 28, 2015, in Application No. 201410322602.9.

(Continued)

*Primary Examiner* — Tung X Le
*Assistant Examiner* — Borna Alaeddini
(74) *Attorney, Agent, or Firm* — Faegre Baker Daniels LLP

(57) ABSTRACT

System controller for a lighting system and method thereof according to certain embodiments. For example, the system controller includes a first controller terminal configured to receive a first signal and a transistor including a first transistor terminal, a second transistor terminal, and a third transistor terminal. Additionally, the system controller includes a second controller terminal coupled to the first transistor terminal, and a third controller terminal coupled to the third transistor terminal. The system controller is configured to determine whether the first signal is associated with a leading-edge TRIAC dimmer based at least in part on the first signal, the leading-edge TRIAC dimmer being configured to receive an AC input voltage associated with at least a first half cycle from a starting time to an ending time.

34 Claims, 8 Drawing Sheets

(52) U.S. Cl.
CPC ..... *H05B 33/0809* (2013.01); *H05B 33/0815* (2013.01); *H05B 33/0842* (2013.01); *H05B 37/02* (2013.01); *H05B 37/0281* (2013.01); *Y02B 20/48* (2013.01)

(58) Field of Classification Search
CPC ............ H05B 33/0824; H05B 33/0818; H05B 33/0848; H05B 39/044; H05B 33/0842; H05B 33/083; H05B 37/02; H05B 37/0281; H05B 30/044; H05B 41/2828; H05B 41/3925
See application file for complete search history.

(56) References Cited

U.S. PATENT DOCUMENTS

| | | | |
|---|---|---|---|
| 4,253,045 A | 2/1981 | Weber | |
| 5,144,205 A | 9/1992 | Motto et al. | |
| 5,249,298 A | 9/1993 | Bolan et al. | |
| 5,504,398 A | 4/1996 | Rothenbuhler | |
| 5,949,197 A | 9/1999 | Kastner | |
| 6,218,788 B1 | 4/2001 | Chen et al. | |
| 6,229,271 B1 | 5/2001 | Liu | |
| 6,278,245 B1 | 8/2001 | Li et al. | |
| 7,038,399 B2 | 5/2006 | Lys et al. | |
| 7,649,327 B2 | 1/2010 | Peng | |
| 7,825,715 B1 | 11/2010 | Greenberg | |
| 7,880,400 B2 | 2/2011 | Zhou et al. | |
| 7,944,153 B2 | 5/2011 | Greenfeld | |
| 8,134,302 B2 | 3/2012 | Yang et al. | |
| 8,278,832 B2 | 10/2012 | Hung et al. | |
| 8,378,583 B2 | 2/2013 | Hying et al. | |
| 8,378,588 B2 | 2/2013 | Kuo et al. | |
| 8,378,589 B2 | 2/2013 | Kuo et al. | |
| 8,415,901 B2 | 4/2013 | Recker et al. | |
| 8,432,438 B2 | 4/2013 | Ryan et al. | |
| 8,497,637 B2 | 7/2013 | Liu | |
| 8,569,956 B2 | 10/2013 | Shteynberg et al. | |
| 8,644,041 B2 | 2/2014 | Pansier | |
| 8,698,419 B2 | 4/2014 | Yan et al. | |
| 8,716,882 B2 | 5/2014 | Pettler et al. | |
| 8,890,440 B2 | 11/2014 | Yan et al. | |
| 8,941,324 B2 | 1/2015 | Zhou et al. | |
| 9,030,122 B2 | 5/2015 | Yan et al. | |
| 9,084,316 B2 * | 7/2015 | Melanson | H02M 1/4225 |
| 9,148,050 B2 | 9/2015 | Chiang | |
| 9,220,133 B2 * | 12/2015 | Salvestrini | H05B 33/0815 |
| 9,220,136 B2 | 12/2015 | Zhang | |
| 9,247,623 B2 | 1/2016 | Recker et al. | |
| 9,247,625 B2 | 1/2016 | Recker et al. | |
| 9,301,349 B2 | 3/2016 | Zhu et al. | |
| 9,332,609 B1 | 5/2016 | Rhodes et al. | |
| 9,402,293 B2 * | 7/2016 | Vaughan | H05B 33/0815 |
| 9,408,269 B2 | 8/2016 | Zhu et al. | |
| 9,414,455 B2 | 8/2016 | Zhou et al. | |
| 9,480,118 B2 * | 10/2016 | Liao | H05B 33/0845 |
| 9,554,432 B2 | 1/2017 | Zhu et al. | |
| 9,585,222 B2 | 2/2017 | Zhu et al. | |
| 9,655,188 B1 | 5/2017 | Lewis et al. | |
| 9,723,676 B2 | 8/2017 | Ganick et al. | |
| 9,750,107 B2 | 8/2017 | Zhu et al. | |
| 9,883,561 B1 | 1/2018 | Liang et al. | |
| 9,883,562 B2 | 1/2018 | Zhu et al. | |
| 9,961,734 B2 | 6/2018 | Zhu et al. | |
| 10,054,271 B2 | 8/2018 | Xiong et al. | |
| 2006/0022648 A1 | 2/2006 | Ben-Yaakov et al. | |
| 2007/0182338 A1 | 8/2007 | Shteynberg et al. | |
| 2007/0182699 A1 | 8/2007 | Ha et al. | |
| 2007/0267978 A1 | 11/2007 | Shteynberg et al. | |
| 2008/0224629 A1 | 9/2008 | Melanson | |
| 2008/0278092 A1 | 11/2008 | Lys et al. | |
| 2009/0021469 A1 | 1/2009 | Yeo et al. | |
| 2009/0251059 A1 | 10/2009 | Veltman | |
| 2010/0141153 A1 | 6/2010 | Recker et al. | |
| 2010/0156319 A1 | 6/2010 | Melanson | |
| 2010/0164406 A1 | 7/2010 | Kost et al. | |
| 2010/0176733 A1 | 7/2010 | King | |
| 2010/0207536 A1 | 8/2010 | Burdalski | |
| 2010/0213859 A1 | 8/2010 | Shteynberg | |
| 2010/0231136 A1 | 9/2010 | Reisenauer et al. | |
| 2011/0037399 A1 | 2/2011 | Hung et al. | |
| 2011/0080110 A1 | 4/2011 | Nuhfer et al. | |
| 2011/0080111 A1 | 4/2011 | Nuhfer et al. | |
| 2011/0101867 A1 | 5/2011 | Wang et al. | |
| 2011/0121744 A1 | 5/2011 | Salvestrini | |
| 2011/0121754 A1 | 5/2011 | Shteynberg | |
| 2011/0133662 A1 | 6/2011 | Yan et al. | |
| 2011/0227490 A1 | 9/2011 | Huynh | |
| 2011/0260619 A1 | 10/2011 | Sadwick | |
| 2011/0285301 A1 | 11/2011 | Kuang et al. | |
| 2011/0291583 A1 | 12/2011 | Shen | |
| 2011/0309759 A1 | 12/2011 | Shteynberg | |
| 2012/0001548 A1 | 1/2012 | Recker et al. | |
| 2012/0032604 A1 | 2/2012 | Hontele | |
| 2012/0069616 A1 | 3/2012 | Kitamura et al. | |
| 2012/0080944 A1 | 4/2012 | Recker et al. | |
| 2012/0081009 A1 | 4/2012 | Shteynberg et al. | |
| 2012/0146526 A1 | 6/2012 | Lam et al. | |
| 2012/0181944 A1 | 7/2012 | Jacobs et al. | |
| 2012/0181946 A1 | 7/2012 | Melanson | |
| 2012/0187857 A1 | 7/2012 | Ulmann et al. | |
| 2012/0242237 A1 | 9/2012 | Chen et al. | |
| 2012/0262093 A1 | 10/2012 | Recker et al. | |
| 2012/0268031 A1 | 10/2012 | Zhou et al. | |
| 2012/0299500 A1 | 11/2012 | Sadwick | |
| 2012/0299501 A1 | 11/2012 | Kost et al. | |
| 2012/0319604 A1 | 12/2012 | Walters | |
| 2012/0326616 A1 | 12/2012 | Stumitani et al. | |
| 2013/0009561 A1 | 1/2013 | Briggs | |
| 2013/0020965 A1 | 1/2013 | Kang et al. | |
| 2013/0026942 A1 | 1/2013 | Ryan et al. | |
| 2013/0026945 A1 | 1/2013 | Ganick et al. | |
| 2013/0027528 A1 | 1/2013 | Staats | |
| 2013/0034172 A1 | 2/2013 | Pettler et al. | |
| 2013/0043726 A1 | 2/2013 | Krishnamoorthy et al. | |
| 2013/0063047 A1 | 3/2013 | Veskovic | |
| 2013/0154487 A1 | 6/2013 | Kuang et al. | |
| 2013/0162158 A1 | 6/2013 | Pollischanshy | |
| 2013/0175931 A1 | 7/2013 | Sadwick | |
| 2013/0181630 A1 | 7/2013 | Taipale et al. | |
| 2013/0193879 A1 | 8/2013 | Sadwick | |
| 2013/0194848 A1 | 8/2013 | Bernardinis et al. | |
| 2013/0215655 A1 | 8/2013 | Yang et al. | |
| 2013/0223107 A1 | 8/2013 | Zhang et al. | |
| 2013/0241427 A1 | 9/2013 | Kesterson et al. | |
| 2013/0241428 A1 | 9/2013 | Takeda | |
| 2013/0241441 A1 * | 9/2013 | Myers | H05B 33/0815 315/307 |
| 2013/0242622 A1 | 9/2013 | Peng | |
| 2013/0307431 A1 | 11/2013 | Zhu et al. | |
| 2013/0307434 A1 | 11/2013 | Zhang | |
| 2014/0009082 A1 * | 1/2014 | King | H05B 37/02 315/247 |
| 2014/0029315 A1 | 1/2014 | Zhang et al. | |
| 2014/0063857 A1 | 3/2014 | Peng | |
| 2014/0078790 A1 | 3/2014 | Lin et al. | |
| 2014/0103829 A1 | 4/2014 | Kang | |
| 2014/0132172 A1 | 5/2014 | Zhu et al. | |
| 2014/0160809 A1 * | 6/2014 | Lin | H02M 3/33523 363/21.16 |
| 2014/0176016 A1 * | 6/2014 | Li | H05B 33/0803 315/307 |
| 2014/0197760 A1 * | 7/2014 | Radermacher | H05B 33/0815 315/307 |
| 2014/0265898 A1 * | 9/2014 | Del Carmen, Jr. | H05B 33/0815 315/200 R |
| 2014/0265935 A1 * | 9/2014 | Sadwick | H05B 33/0815 315/307 |
| 2014/0268935 A1 | 9/2014 | Chiang | |
| 2014/0346973 A1 | 11/2014 | Zhu et al. | |
| 2014/0354170 A1 * | 12/2014 | Gredler | H05B 33/0815 315/224 |

(56) References Cited

U.S. PATENT DOCUMENTS

| | | |
|---|---|---|
| 2015/0035450 A1 | 2/2015 | Werner |
| 2015/0077009 A1 | 3/2015 | Kunimatsu |
| 2015/0091470 A1 | 4/2015 | Zhou et al. |
| 2015/0312982 A1 | 10/2015 | Melanson |
| 2015/0312988 A1 | 10/2015 | Liao et al. |
| 2015/0333764 A1 | 11/2015 | Pastore et al. |
| 2015/0357910 A1 | 12/2015 | Murakami et al. |
| 2015/0359054 A1 | 12/2015 | Lin et al. |
| 2015/0366010 A1 | 12/2015 | Mao et al. |
| 2016/0014861 A1 | 1/2016 | Zhu et al. |
| 2016/0014865 A1 | 1/2016 | Zhu et al. |
| 2016/0037604 A1 | 2/2016 | Zhu et al. |
| 2016/0119998 A1 | 4/2016 | Linnartz et al. |
| 2016/0286617 A1 | 9/2016 | Takahashi et al. |
| 2016/0338163 A1 | 11/2016 | Zhu et al. |
| 2017/0027029 A1 | 1/2017 | Hu et al. |
| 2017/0064787 A1 | 3/2017 | Liao et al. |
| 2017/0181235 A1 | 6/2017 | Zhu et al. |
| 2017/0196063 A1 | 7/2017 | Zhu et al. |
| 2017/0251532 A1* | 8/2017 | Wang .............. H05B 33/0818 |
| 2017/0311409 A1 | 10/2017 | Zhu et al. |
| 2017/0354008 A1 | 12/2017 | Eum et al. |
| 2017/0359880 A1 | 12/2017 | Zhu et al. |
| 2018/0103520 A1 | 4/2018 | Zhu et al. |
| 2018/0288845 A1 | 10/2018 | Zhu et al. |

FOREIGN PATENT DOCUMENTS

| | | |
|---|---|---|
| CN | 101868090 | 10/2010 |
| CN | 101896022 A | 11/2010 |
| CN | 101917804 A | 12/2010 |
| CN | 101998734 A | 3/2011 |
| CN | 102014540 | 4/2011 |
| CN | 102014551 A | 4/2011 |
| CN | 102056378 A | 5/2011 |
| CN | 102209412 A | 10/2011 |
| CN | 102300375 A | 12/2011 |
| CN | 102347607 | 2/2012 |
| CN | 102387634 A | 3/2012 |
| CN | 103004290 | 3/2012 |
| CN | 102474953 | 5/2012 |
| CN | 102497706 | 6/2012 |
| CN | 202353859 U | 7/2012 |
| CN | 102695330 A | 9/2012 |
| CN | 102791056 A | 11/2012 |
| CN | 102843836 A | 12/2012 |
| CN | 202632722 U | 12/2012 |
| CN | 102870497 | 1/2013 |
| CN | 102946674 A | 2/2013 |
| CN | 103024994 A | 4/2013 |
| CN | 103260302 A | 8/2013 |
| CN | 103313472 | 9/2013 |
| CN | 103369802 A | 10/2013 |
| CN | 103379712 A | 10/2013 |
| CN | 103547014 | 1/2014 |
| CN | 103716934 | 4/2014 |
| CN | 103858524 | 6/2014 |
| CN | 203675408 U | 6/2014 |
| CN | 103945614 A | 7/2014 |
| CN | 103096606 B | 12/2014 |
| CN | 103781229 B | 9/2015 |
| CN | 105265019 | 1/2016 |
| CN | 105423140 A | 3/2016 |
| CN | 105591553 A | 5/2016 |
| CN | 105873269 | 8/2016 |
| CN | 205812458 U | 12/2016 |
| CN | 106358337 A | 1/2017 |
| CN | 106793246 A | 5/2017 |
| CN | 107046751 A | 8/2017 |
| EP | 2403318 A1 | 1/2012 |
| JP | 2008-010152 A | 1/2008 |
| JP | 2011-249328 A | 12/2011 |
| TW | 201215228 A1 | 9/2010 |
| TW | 201125441 A | 7/2011 |
| TW | 201132241 | 9/2011 |
| TW | 201143530 A | 12/2011 |
| TW | 201146087 A1 | 12/2011 |
| TW | 201204168 A1 | 1/2012 |
| TW | 201208463 A1 | 2/2012 |
| TW | 201208481 A1 | 2/2012 |
| TW | 201208486 | 2/2012 |
| TW | 201233021 A | 8/2012 |
| TW | I 387396 | 2/2013 |
| TW | 201315118 A | 4/2013 |
| TW | 201322825 A | 6/2013 |
| TW | 201342987 | 10/2013 |
| TW | I-422130 | 1/2014 |
| TW | I 423732 | 1/2014 |
| TW | 201412189 A | 3/2014 |
| TW | 201414146 A | 4/2014 |
| TW | M477115 | 4/2014 |
| TW | 201417626 A | 5/2014 |
| TW | 201417631 | 5/2014 |
| TW | 201422045 | 6/2014 |
| TW | 201424454 A | 6/2014 |
| TW | I 448198 | 8/2014 |
| TW | 201503756 A | 1/2015 |
| TW | I 496502 B | 8/2015 |
| TW | 201630468 A | 8/2016 |
| TW | 201639415 A | 11/2016 |

OTHER PUBLICATIONS

China Patent Office, Office Action dated Aug. 8, 2015, in Application No. 201410172086.6.

China Patent Office, Office Action dated Mar. 2, 2016, in Application No. 201410172086.6.

China Patent Office, Office Action dated Dec. 14, 2015, in Application No. 201210166672.0.

China Patent Office, Office Action dated Sep. 2, 2016, in Application No. 201510103579.9.

China Patent Office, Office Action dated Jul. 7, 2014, in Application No. 201210468505.1.

China Patent Office, Office Action dated Jun. 3, 2014, in Application No. 201110103130.4.

China Patent Office, Office Action dated Jun. 30, 2015, in Application No. 201410171893.6.

China Patent Office, Office Action dated Nov. 15, 2014, in Application No. 201210166672.0.

China Patent Office, Office Action dated Oct. 19, 2015, in Application No. 201410322612.2.

China Patent Office, Office Action dated Mar. 22, 2016, in Application No. 201410322612.2.

Taiwan Intellectual Property Office, Office Action dated Jan. 7, 2014, in Application No. 100119272.

Taiwan Intellectual Property Office, Office Action dated Jun. 9, 2014, in Application No. 101124982.

Taiwan Intellectual Property Office, Office Action dated Nov. 13, 2015, in Application No. 103141628.

Taiwan Intellectual Property Office, Office Action dated Sep. 17, 2015, in Application No. 103127108.

Taiwan Intellectual Property Office, Office Action dated Sep. 17, 2015, in Application No. 103127620.

Taiwan Intellectual Property Office, Office Action dated Sep. 25, 2014, in Application No. 101148716.

Taiwan Intellectual Property Office, Office Action dated Apr. 18, 2016, in Application No. 103140989.

Taiwan Intellectual Property Office, Office Action dated Aug. 23, 2017, in Application No. 106103535.

United States Patent and Trademark Office, Office Action dated Dec. 17, 2015, in U.S. Appl. No. 14/459,167.

United States Patent and Trademark Office, Office Action dated Sep. 6, 2016, in U.S. Appl. No. 14/459,167.

United States Patent and Trademark Office, Office Action dated Jun. 27, 2017, in U.S. Appl. No. 14/459,167.

United States Patent and Trademark Office, Notice of Allowance dated Dec. 26, 2017, in U.S. Appl. No. 14/459,167.

United States Patent and Trademark Office, Office Action dated Aug. 29, 2017, in U.S. Appl. No. 15/158,237.

(56) References Cited

OTHER PUBLICATIONS

United States Patent and Trademark Office, Notice of Allowance dated Apr. 21, 2017, in U.S. Appl. No. 15/364,100.
United States Patent and Trademark Office, Notice of Allowance dated Jul. 27, 2017, in U.S. Appl. No. 15/364,100.
United States Patent and Trademark Office, Notice of Allowance dated Nov. 1, 2017, in U.S. Appl. No. 15/364,100.
United States Patent and Trademark Office, Office Action dated Apr. 20, 2017, in U.S. Appl. No. 15/263,080.
United States Patent and Trademark Office, Office Action dated Sep. 12, 2017, in U.S. Appl. No. 15/263,080.
United States Patent and Trademark Office, Office Action dated Jun. 1, 2017, in U.S. Appl. No. 15/372,324.
United States Patent and Trademark Office, Office Action dated Dec. 13, 2017, in U.S. Appl. No. 15/372,324.
United States Patent and Trademark Office, Notice of Allowance dated Jul. 13, 2017, in U.S. Appl. No. 15/403,520.
United States Patent and Trademark Office, Notice of Allowance dated Oct. 10, 2017, in U.S. Appl. No. 15/403,520.
United States Patent and Trademark Office, Office Action dated Oct. 3, 2017, in U.S. Appl. No. 15/649,586.
United States Patent and Trademark Office, Office Action dated Oct. 3, 2017, in U.S. Appl. No. 15/649,566.
United States Patent and Trademark Office, Notice of Allowance dated Mar. 23, 2018, in U.S. Appl. No. 15/158,237.
United States Patent and Trademark Office, Notice of Allowance dated Jan. 30, 2018, in U.S. Appl. No. 15/263,080.
United States Patent and Trademark Office, Notice of Allowance dated Jun. 4, 2018, in U.S. Appl. No. 15/263,080.
United States Patent and Trademark Office, Notice of Allowance dated May 23, 2018, in U.S. Appl. No. 15/649,586.
United States Patent and Trademark Office, Office Action dated May 11, 2018, in U.S. Appl. No. 15/649,566.
United States Patent and Trademark Office, Office Action dated Mar. 6, 2018, in U.S. Appl. No. 15/836,461.
United States Patent and Trademark Office, Office Action dated Aug. 3, 2018, in U.S. Appl. No. 15/372,324.
Taiwan Intellectual Property Office, Office Action dated Feb. 27, 2018, in Application No. 106136242.
Taiwan Intellectual Property Office, Office Action dated Feb. 6, 2018, in Application No. 106130686.
United States Patent and Trademark Office, Notice of Allowance dated Oct. 19, 2018, in U.S. Appl. No. 15/158,237.
United States Patent and Trademark Office, Notice of Allowance dated Sep. 24, 2018, in U.S. Appl. No. 15/849,452.
United States Patent and Trademark Office, Notice of Allowance dated Oct. 24, 2018, in U.S. Appl. No. 15/649,586.
United States Patent and Trademark Office, Office Action dated Nov. 2, 2018, in U.S. Appl. No. 15/836,461.
United States Patent and Trademark Office, Office Action dated Oct. 3, 2018, in U.S. Appl. No. 15/934,460.
United States Patent and Trademark Office, Notice of Allowance dated Oct. 3, 2018, in U.S. Appl. No. 15/263,080.
China Patent Office, Office Action dated Nov. 29, 2018, in Application No. 201710828263.5.
China Patent Office, Office Action dated Dec. 3, 2018, in Application No. 201710557179.4.
Taiwan Intellectual Property Office, Office Action dated Jan. 14, 2019, in Application No. 107107508.
United States Patent and Trademark Office, Notice of Allowance dated Jan. 25, 2019, in U.S. Appl. No. 15/849,452.
United States Patent and Trademark Office, Notice of Allowance dated Jan. 7, 2019, in U.S. Appl. No. 15/372,324.
United States Patent and Trademark Office, Notice of Allowance dated Dec. 27, 2018, in U.S. Appl. No. 15/649,566.
United States Patent and Trademark Office, Office Action dated Jan. 11, 2019, in U.S. Appl. No. 16/009,727.
United States Patent and Trademark Office, Notice of Allowance dated Nov. 30, 2018, in U.S. Appl. No. 15/263,080.

* cited by examiner

SYSTEMS AND METHODS FOR INTELLIGENT CONTROL RELATED TO TRIAC DIMMERS BY USING MODULATION SIGNALS

1. CROSS-REFERENCES TO RELATED APPLICATIONS

This application is a continuation of U.S. patent application Ser. No. 15/364,100, filed Nov. 29, 2016, which claims priority to Chinese Patent Application No. 201610906129.8, filed Oct. 17, 2016, both of the above-referenced applications being incorporated by reference herein for all purposes.

Additionally, this application is related to U.S. patent application Ser. Nos. 14/593,734 and 14/451,656, both of which are incorporated by reference herein for all purposes.

2. BACKGROUND OF THE INVENTION

Certain embodiments of the present invention are directed to integrated circuits. More particularly, some embodiments of the invention provide a system and method for intelligent control related to TRIAC dimmers by using modulation signal. Merely by way of example, some embodiments of the invention have been applied to driving light emitting diodes (LEDs). But it would be recognized that the invention has a much broader range of applicability.

A conventional lighting system may include or may not include a TRIAC dimmer that is a dimmer including a Triode for Alternating Current (TRIAC). For example, the TRIAC dimmer is either a leading-edge TRIAC dimmer or a trailing-edge TRIAC dimmer. Often, the leading-edge TRIAC dimmer and the trailing-edge TRIAC dimmer are configured to receive an alternating-current (AC) input voltage, process the AC input voltage by clipping part of the waveform of the AC input voltage, and generate an voltage that is then received by a rectifier (e.g., a full wave rectifying bridge) in order to generate a rectified output voltage.

FIG. 1 shows certain conventional timing diagrams for a leading-edge TRIAC dimmer and a trailing-edge TRIAC dimmer. The waveforms 110, 120, and 130 are merely examples. Each of the waveforms 110, 120, and 130 represents a rectified output voltage as a function of time that is generated by a rectifier. For the waveform 110, the rectifier receives an AC input voltage without any processing by a TRIAC dimmer. For the waveform 120, an AC input voltage is received by a leading-edge TRIAC dimmer, and the voltage generated by the leading-edge TRIAC dimmer is received by the rectifier, which then generates the rectified output voltage. For the waveform 130, an AC input voltage is received by a trailing-edge TRIAC dimmer, and the voltage generated by the trailing-edge TRIAC dimmer is received by the rectifier, which then generates the rectified output voltage.

As shown by the waveform 110, each cycle of the rectified output voltage has, for example, a phase angel (e.g., ϕ) that changes from 0° to 180° and then from 180° to 360°. As shown by the waveform 120, the leading-edge TRIAC dimmer usually processes the AC input voltage by clipping part of the waveform that corresponds to the phase angel starting at 0° or starting at 180°. As shown by the waveform 130, the trailing-edge TRIAC dimmer often processes the AC input voltage by clipping part of the waveform that corresponds to the phase angel ending at 180° or ending at 360°.

Various conventional technologies have been used to detect whether or not a TRIAC dimmer has been included in a lighting system, and if a TRIAC dimmer is detected to be included in the lighting system, whether the TRIAC dimmer is a leading-edge TRIAC dimmer or a trailing-edge TRIAC dimmer. In one conventional technology, a rectified output voltage generated by a rectifier is compared with a threshold voltage $V_{th\_on}$ in order to determine a turn-on time period $T_{on}$. If the turn-on time period $T_{on}$ is equal to the duration of a half cycle of the AC input voltage, no TRIAC dimmer is determined to be included in the lighting system; if the turn-on time period $T_{on}$ is smaller than the duration of a half cycle of the AC input voltage, a TRIAC dimmer is determined to be included in the lighting system. If a TRIAC dimmer is determined to be included in the lighting system, a turn-on voltage $V_{on}$ is compared with the threshold voltage $V_{th\_on}$. If the turn-on voltage $V_{on}$ is larger than the threshold voltage $V_{th\_on}$, the TRIAC dimmer is determined to be a leading-edge TRIAC dimmer; if the turn-on voltage $V_{on}$ is smaller than the threshold voltage $V_{th\_on}$, the TRIAC dimmer is determined to be a trailing-edge TRIAC dimmer.

In another conventional technology, a rate of change of a rectified output voltage is used. The rectified output voltage is generated by a rectifier, and its rate of change is determined by quickly sampling the rectified voltage twice. Depending on the phase angles at which these two sampling actions are taken, a predetermined range for the rate of change is used. If the rate of change falls within this predetermined range, no TRIAC dimmer is determined to be included in the lighting system; if the rate of change falls outside this predetermined range, a TRIAC dimmer is determined to be included in the lighting system. If a TRIAC dimmer is determined to be included in the lighting system, whether the rate of change is positive or negative is used to determine the type of the TRIAC dimmer. If the rate of change is positive, the TRIAC dimmer is determined to be a leading-edge TRIAC dimmer; if the rate of change is negative, the TRIAC dimmer is determined to be a trailing-edge TRIAC dimmer.

If a conventional lighting system includes a TRIAC dimmer and light emitting diodes (LEDs), the light emitting diodes may flicker if the current that flows through the TRIAC dimmer falls below a holding current that is, for example, required by the TRIAC dimmer. As an example, if the current that flows through the TRIAC dimmer falls below the holding current, the TRIAC dimmer may turn on and off repeatedly, thus causing the LEDs to flicker. As another example, the various TRIAC dimmers made by different manufacturers have different holding currents ranging from 5 mA to 50 mA.

In order to solve this flickering problem, certain conventional technology uses a bleeder for the conventional lighting system. FIG. 2 is a simplified diagram of a conventional lighting system that includes a bleeder. As shown, the lighting system 200 includes a TRIAC dimmer 210, a rectifier 220, a bleeder 230, an LED driver 240, and LEDs 250. The TRIAC dimmer 210 receives an AC input voltage 214 (e.g., $V_{line}$) and generates a voltage 212. The voltage 212 is received by the rectifier 220 (e.g., a full wave rectifying bridge), which then generates a rectified output voltage 222 and a rectified output current 260. The rectified output current 260 is equal to the current that flows through the TRIAC dimmer 210, and is also equal to the sum of currents 232 and 242. The current 232 is received by the bleeder 230, and the current 242 is received by the LED driver 240. The magnitude of the current 232 may have a fixed magnitude or may change between two different predetermined magnitudes.

FIG. 3 is a simplified diagram showing certain conventional components of the bleeder as part of the lighting system 200 as shown in FIG. 2. The bleeder 230 includes a resistor 270 and a transistor 280. The transistor 280 receives a drive signal 282. If the drive signal 282 is at a logic high level, the transistor 280 is turned on, and if the drive signal 282 is at a logic low level, the transistor 280 is turned off.

For example, the TRIAC dimmer 210 is a trailing-edge TRIAC dimmer, the drive signal 282 remains at the logic low level, and the transistor 280 remains turned off. In another example, the TRIAC dimmer 210 is a leading-edge TRIAC dimmer as shown by a waveform 294, the drive signal 282 changes between the logic low level and the logic high level as shown by a waveform 292, and the transistor 280 is turned off and on.

As shown in FIG. 3, the waveform 290 represents the voltage 212 as a function of time for a leading-edge TRIAC dimmer as the TRIAC dimmer 210, and the waveform 292 represents the drive signal 282 as a function of time. If the rectified output current 260 becomes smaller than the holding current of the leading-edge TRIAC dimmer as the TRIAC dimmer 210, the drive signal 282 is generated at the logic high level in order to turn on the transistor 280 and increase the rectified output current 260.

FIG. 4 is a simplified diagram showing some conventional components of the bleeder as part of the lighting system 200 as shown in FIG. 2. The bleeder 230 includes a current detection circuit 310, a logic control circuit 320, and current sinks 330 and 340. As shown in FIG. 4, a current 350 is configured to follow through a resistor 360 in order to generate a voltage 370 (e.g., $V_1$). The current 350 equals the rectified output current 260 in magnitude, and the voltage 370 represents the magnitude of the current 350. The voltage 370 is divided by resistors 362 and 364 to generate a voltage 372 (e.g., $V_2$). The voltage 372 is received by the current detection circuit 310, which sends detected information to the logic control circuit 320. In response, the logic control circuit 320 either enables the current sink 330 with a control signal 332 or enables the current sink 340 with a control signal 342. The control signals 332 and 342 are generated by the logic control circuit 320 and are complementary to each other. If the current sink 330 is enabled, the current 232 received by the bleeder 230 is equal to a current 334; if the current sink 340 is enabled, the current 232 is equal to a current 344. The current 344 is larger than the current 334 in magnitude.

Returning to FIG. 2, the voltage 212 generated by the TRIAC dimmer 210 may have waveforms that are not symmetric between a positive half cycle and a negative half cycle of the AC input voltage 214. This lack of symmetry can cause the current that flows through the LEDs 250 to vary with time; therefore, the LEDs 250 can flicker at a fixed frequency (e.g., 50 Hz or 60 Hz). Also, the lighting system 200 often has only limited efficiency in energy consumption.

Hence it is highly desirable to improve the techniques of dimming control.

3. BRIEF SUMMARY OF THE INVENTION

Certain embodiments of the present invention are directed to integrated circuits. More particularly, some embodiments of the invention provide a system and method for intelligent control related to TRIAC dimmers by using modulation signal. Merely by way of example, some embodiments of the invention have been applied to driving light emitting diodes (LEDs). But it would be recognized that the invention has a much broader range of applicability.

According to one embodiment, a system controller for a lighting system includes a first controller terminal configured to receive a first signal and a transistor including a first transistor terminal, a second transistor terminal, and a third transistor terminal. Additionally, the system controller includes a second controller terminal coupled to the first transistor terminal, and a third controller terminal coupled to the third transistor terminal. The system controller is configured to determine whether the first signal is associated with a leading-edge TRIAC dimmer based at least in part on the first signal, the leading-edge TRIAC dimmer being configured to receive an AC input voltage associated with at least a first half cycle from a starting time to an ending time. Moreover, the system controller is configured to: in response to the first signal being determined to be associated with the leading-edge TRIAC dimmer, generate a drive signal; and send the drive signal to the second transistor terminal. The system controller is further configured to: keep the drive signal at a first logic level to turn on the transistor from a first time, the first time being the same or after the starting time; in response to determining that the first signal satisfies a first condition, start, at a second time, modulating the drive signal by changing the drive signal between the first logic level and a second logic level to turn on and off the transistor; keep modulating the drive signal for a first predetermined time period from the second time to a third time; stop, at the third time, modulating the drive signal to keep the drive signal at the second logic level to turn off the transistor; in response to determining that the first signal satisfies a second condition, start, at a fourth time, modulating the drive signal by changing the drive signal between the first logic level and the second logic level to turn on and off the transistor, the fourth time being before the ending time; keep modulating the drive signal for a second predetermined time period from the fourth time to a fifth time; and stop, at the fifth time, modulating the drive signal to keep the drive signal at the first logic level to turn on the transistor.

According to another embodiment, a system controller for a lighting system includes a first controller terminal configured to receive a first signal and a transistor including a first transistor terminal, a second transistor terminal, and a third transistor terminal. Additionally, the system controller includes a second controller terminal coupled to the first transistor terminal and a third controller terminal coupled to the third transistor terminal. The system controller is configured to determine whether the first signal is associated with a leading-edge TRIAC dimmer based at least in part on the first signal, the leading-edge TRIAC dimmer being configured to receive an AC input voltage associated with at least a first half cycle, a second half cycle, and a third half cycle, the first half cycle immediately preceding the second half cycle, the third half cycle following the first half cycle and the second half cycle. Moreover, the system controller is configured to: in response to the first signal being determined to be associated with the leading-edge TRIAC dimmer, generate a drive signal; and send the drive signal to the second transistor terminal. The system controller is further configured to: within the first half cycle, determine a first time period from a first time when the first signal becomes larger than a first threshold to a second time when the first signal becomes smaller than a second threshold; within the second half cycle, determine a second time period from a third time when the first signal becomes larger than the first threshold to a fourth time when the first signal becomes smaller than the second threshold; and determine a third time period and a fourth time period based at least in part on the first time period and the second time period. The system controller is further configured to: within the third half cycle, in response to determining that the first signal satisfies a first condition, start, at a fifth time, modulating the drive signal by changing the drive signal between a first logic level and a second logic level to turn on and off the transistor; keep modulating the drive signal for the third time period from the fifth time; within the third half cycle, in response to determining that the first signal satisfies a second condition, start, at a sixth time, modulating the drive signal by changing the drive signal between the first logic level and the second logic level to turn on and off the transistor; and keep modulating the drive signal for the fourth time period from the sixth time.

According to yet another embodiment, a method for a lighting system includes receiving a first signal and determining whether the first signal is associated with a leading-edge TRIAC dimmer based at least in part on the first signal, the leading-edge TRIAC dimmer being configured to receive an AC input voltage associated with at least a first half cycle from a starting time to an ending time. Additionally, the method includes: in response to the first signal being determined to be associated with the leading-edge TRIAC dimmer, generating a drive signal; and sending the drive signal to a transistor. The process of in response to the first signal being determined to be associated with the leading-edge TRIAC dimmer, generating a drive signal includes: keeping the drive signal at a first logic level to turn on the transistor from a first time, the first time being the same or after the starting time; in response to determining that the first signal satisfies a first condition, starting, at a second time, modulating the drive signal by changing the drive signal between the first logic level and a second logic level to turn on and off the transistor; keeping modulating the drive signal for a first predetermined time period from the second time to a third time; stopping, at the third time, modulating the drive signal to keep the drive signal at the second logic level to turn off the transistor; in response to determining that the first signal satisfies a second condition, starting, at a fourth time, modulating the drive signal by changing the drive signal between the first logic level and the second logic level to turn on and off the transistor, the fourth time being before the ending time; keeping modulating the drive signal for a second predetermined time period from the fourth time to a fifth time; and stopping, at the fifth time, modulating the drive signal to keep the drive signal at the first logic level to turn on the transistor.

According to yet another embodiment, a method for a lighting system includes receiving a first signal and determining whether the first signal is associated with a leading-edge TRIAC dimmer based at least in part on the first signal, the leading-edge TRIAC dimmer being configured to receive an AC input voltage associated with at least a first half cycle, a second half cycle, and a third half cycle, the first half cycle immediately preceding the second half cycle, the third half cycle following the first half cycle and the second half cycle. Additionally, the method includes: in response to the first signal being determined to be associated with the leading-edge TRIAC dimmer, generating a drive signal; and sending the drive signal to a transistor. The process of in response to the first signal being determined to be associated with the leading-edge TRIAC dimmer, generating a drive signal includes: within the first half cycle, determining a first time period from a first time when the first signal becomes larger than a first threshold to a second time when the first signal becomes smaller than a second threshold; within the second half cycle, determining a second time period from a third time when the first signal becomes larger than the first threshold to a fourth time when the first signal becomes smaller than the second threshold; determining a third time period and a fourth time period based at least in part on the first time period and the second time period; within the third half cycle, in response to determining that the first signal satisfies a first condition, starting, at a fifth time, modulating the drive signal by changing the drive signal between a first logic level and a second logic level to turn on and off the transistor; keeping modulating the drive signal for the third time period from the fifth time; within the third half cycle, in response to determining that the first signal satisfies a second condition, starting, at a sixth time, modulating the drive signal by changing the drive signal between the first logic level and the second logic level to turn on and off the transistor; and keeping modulating the drive signal for the fourth time period from the sixth time.

Depending upon embodiment, one or more benefits may be achieved. These benefits and various additional objects, features and advantages of the present invention can be fully appreciated with reference to the detailed description and accompanying drawings that follow.

4. BRIEF DESCRIPTION OF THE DRAWINGS

5. DETAILED DESCRIPTION OF THE INVENTION

Certain embodiments of the present invention are directed to integrated circuits. More particularly, some embodiments of the invention provide a system and method for intelligent control related to TRIAC dimmers by using modulation signal. Merely by way of example, some embodiments of the invention have been applied to driving light emitting diodes (LEDs). But it would be recognized that the invention has a much broader range of applicability.

As discussed earlier, various conventional technologies have been used to detect whether or not a TRIAC dimmer has been included in a lighting system, and if a TRIAC dimmer is detected to be included in the lighting system, whether the TRIAC dimmer is a leading-edge TRIAC dimmer or a trailing-edge TRIAC dimmer. These conventional technologies have various weaknesses.

In one conventional technology, a rectified output voltage generated by a rectifier is compared with a threshold voltage $V_{th\_on}$ in order to determine a turn-on time period $T_{on}$. This conventional technology, however, often cannot effectively distinguish the situation where no TRIAC dimmer is included in a lighting system from the situation where a trailing-edge TRIAC dimmer is included in a lighting system. In the situation where a trailing-edge TRIAC dimmer is included in a lighting system, the voltage generated by the trailing-edge TRIAC dimmer after the dimmer is turned off decreases slowly to the threshold voltage $V_{th\_on}$ due to charging and/or discharging of one or more capacitors. This slow reduction of the voltage makes it difficult to compare the turn-on time period $T_{on}$ and the duration of a half cycle of the AC input voltage; hence the determination about whether a TRIAC dimmer has been included in a lighting system and/or whether a trailing-edge TRIAC dimmer has been included in a lighting system becomes unreliable.

In another conventional technology, a rate of change of a rectified output voltage is used. The rectified output voltage is generated by a rectifier, and its rate of change is determined by quickly sampling the rectified voltage twice. Hence this conventional technology needs real-time fast calculation of rate of change between two successively sampled rectified voltage values, and also needs storage of various predetermined ranges for the rate of change that correspond to various phase angles at which these two sampling actions are taken. Such computation and storage often impose significant demand on bit depth of an analog-to-digital converter, computational capability of the system, and storage capacity of the system.

Figure 1:
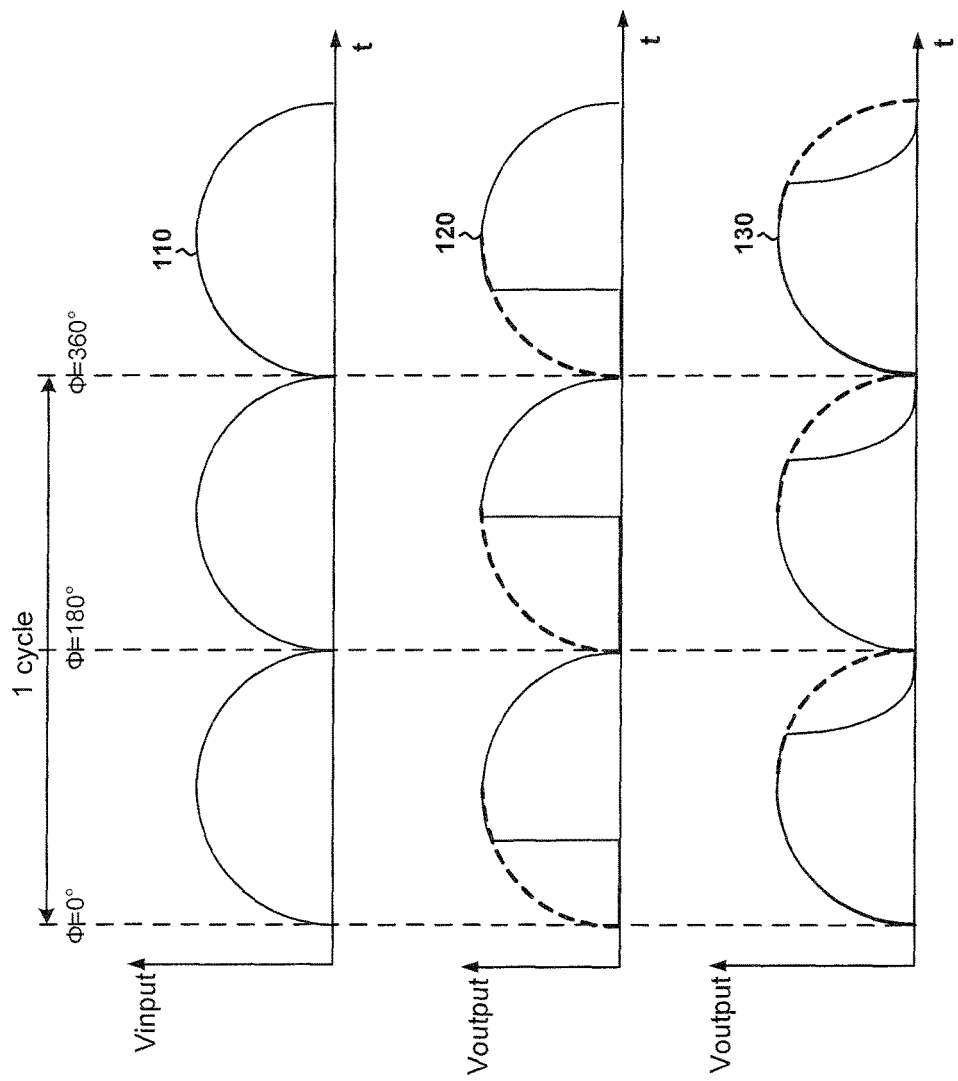
FIG. 1 shows certain conventional timing diagrams for a leading-edge TRIAC dimmer and a trailing-edge TRIAC dimmer.
Figure 2:
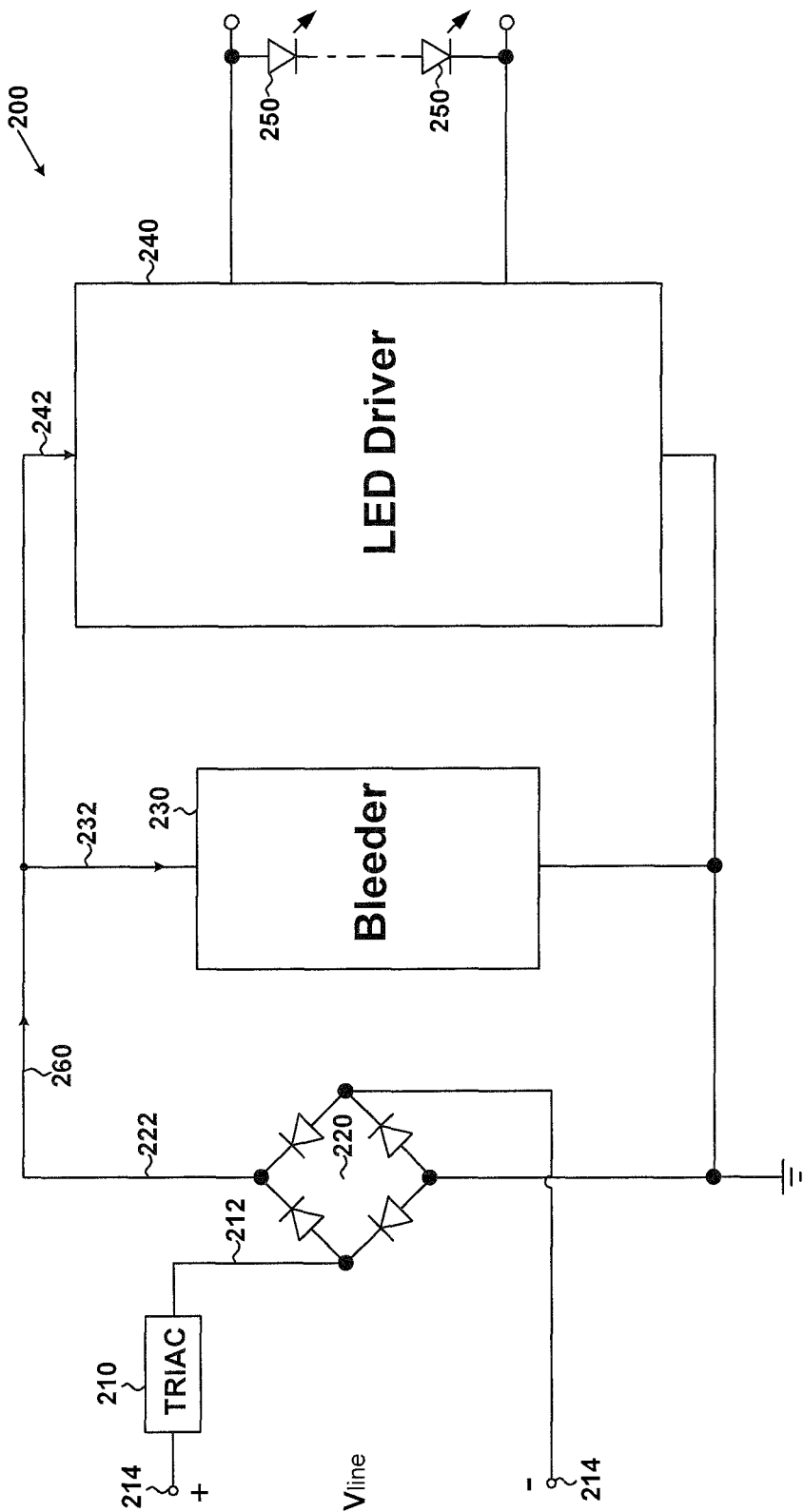
FIG. 2 is a simplified diagram of a conventional lighting system that includes a bleeder.
Figure 3:
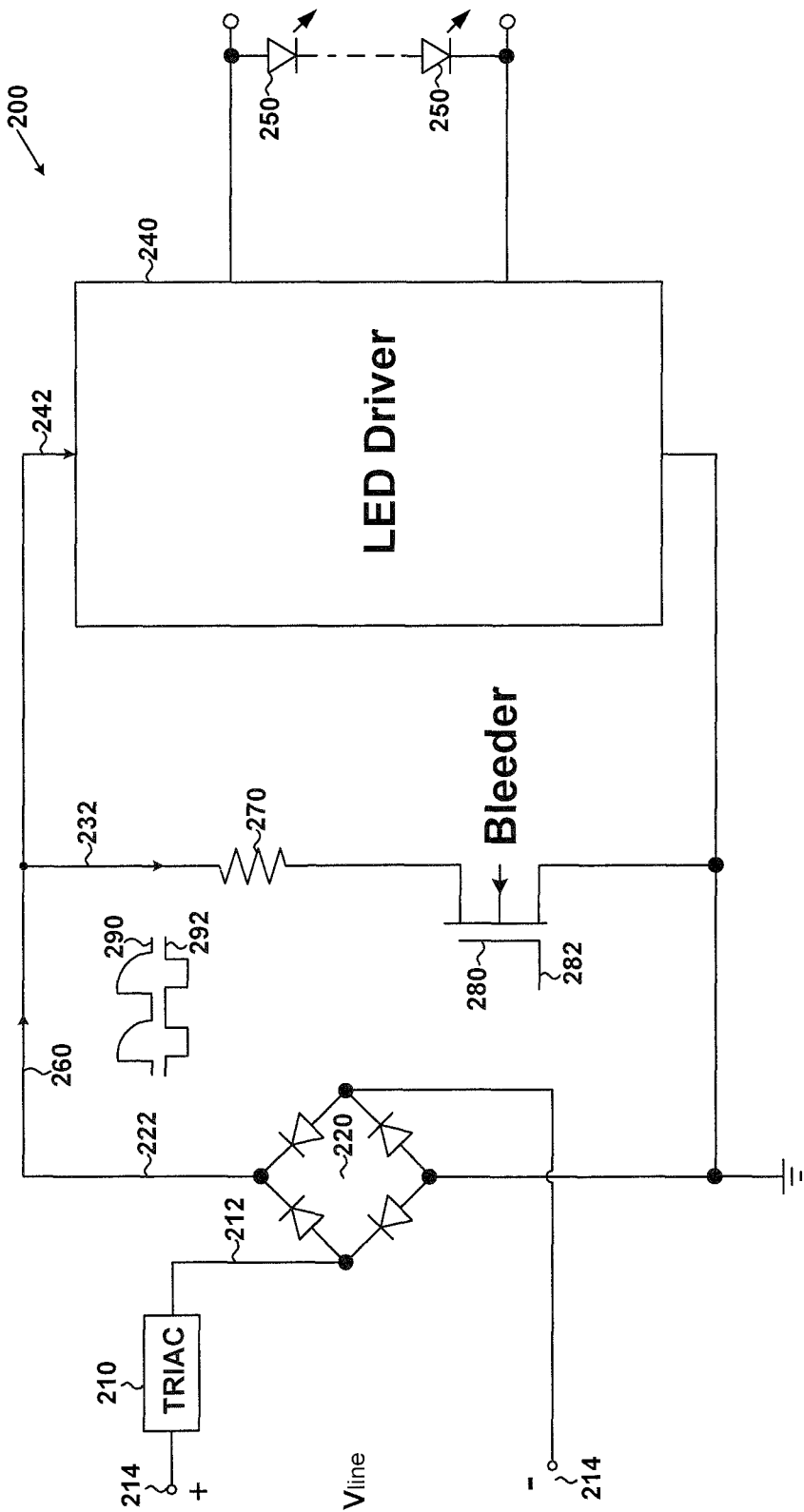
FIG. 3 is a simplified diagram showing certain conventional components of the bleeder as part of the lighting system as shown in FIG. 2.

Additionally, referring to FIG. 2, the current 232 is received by the bleeder 230. As shown in FIG. 3, if the rectified output current 260 becomes smaller than the holding current of the leading-edge TRIAC dimmer as the TRIAC dimmer 210, the drive signal 282 is generated at the logic high level in order to turn on the transistor 280 and increase the rectified output current 260. One weakness of this conventional technology as shown in FIGS. 2 and 3 is that the current 232 that flows through the resistor 270 generates heat and thus reduces efficiency of the lighting system 200.

Figure 4:
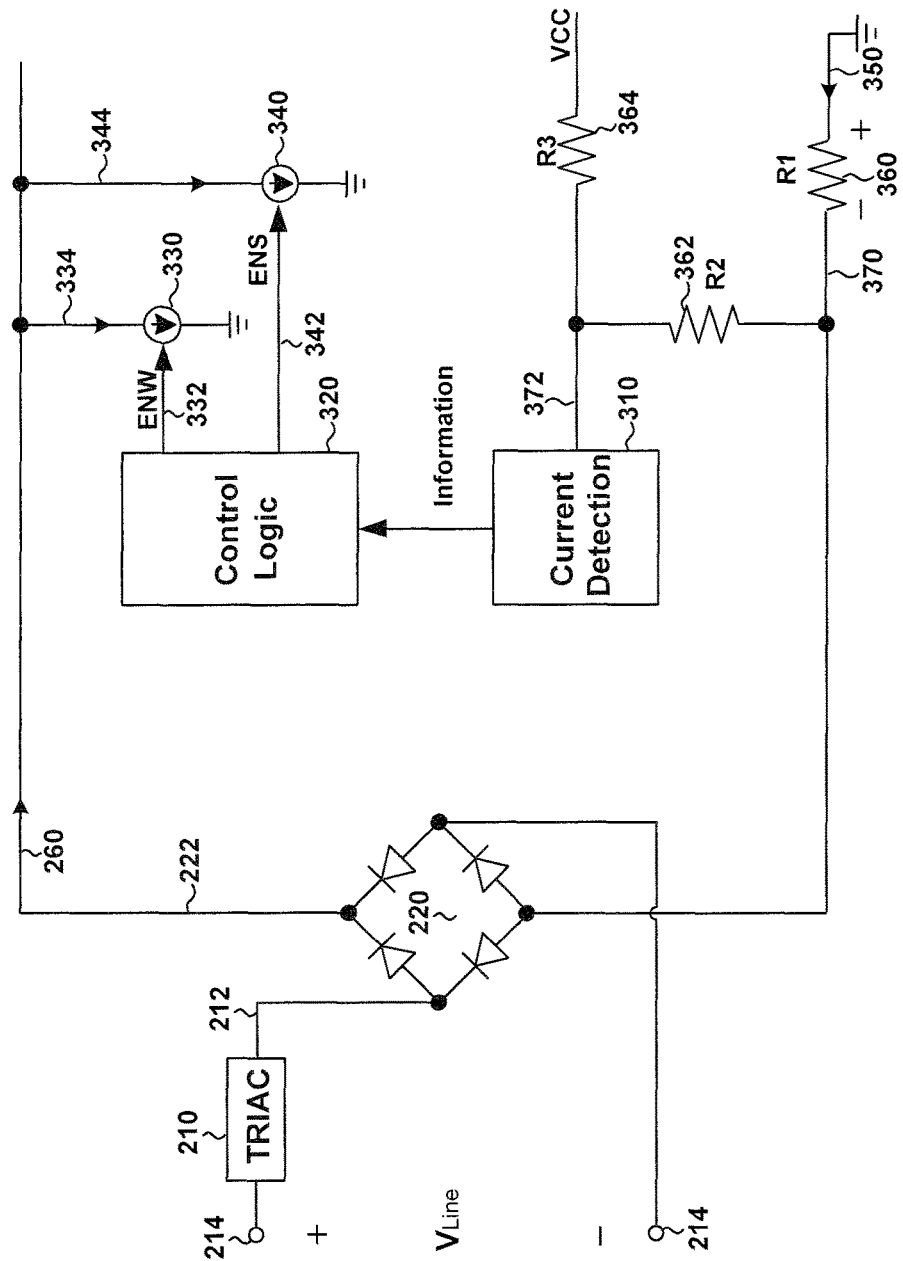
FIG. 4 is a simplified diagram showing some conventional components of the bleeder as part of the lighting system as shown in FIG. 2.

Also, as shown in FIG. 4, the magnitude of the current 232 can change between two different predetermined magnitudes. The current 232 equals the current 334 or the current 344, and the current 344 is larger than the current 334 in magnitude. One weakness of this conventional technology as shown in FIGS. 2 and 4 is that the currents 334 and 344 each have a fixed magnitude. If the holding current of the TRIAC dimmer 210 is higher than both the currents 334 and 344 in magnitude, the LEDs 250 may flicker. If the holding current of the TRIAC dimmer 210 is lower than the current 344 but higher than the current 334 in magnitude, setting the current 232 equal to the current 334 may cause the LEDs 250 to flicker, but setting the current 232 equal to the current 344 may waste energy and thus lower efficiency of the system.

Certain embodiments of the present invention provide an intelligent mechanism to match and control a TRIAC dimmer. According to one embodiment, the intelligent mechanism can reliably and automatically detect whether or not a TRIAC dimmer has been included in a lighting system, and if a TRIAC dimmer is detected to be included in the lighting system, whether the TRIAC dimmer is a leading-edge TRIAC dimmer or a trailing-edge TRIAC dimmer. For example, this reliable and automatic detection can help to select appropriate method of dimming control in order to improve energy efficiency of the system.

According to another embodiment, if a TRIAC dimmer is detected to be included in the lighting system and the TRIAC dimmer is a leading-edge TRIAC dimmer, the intelligent mechanism can provide two separate bursts of modulation signals for each half-cycle of the AC input voltage and use these separate bursts of modulation signals to improve performance and efficiency of a lighting system. In one embodiment, one burst of the two separate bursts of modulation signals is used to ensure that a transistor is modulated between on and off for a sufficiently long period of time, so that the current flowing through the TRIAC dimmer is not lower than the holding current of the TRIAC dimmer. In another embodiment, the other burst of the two separate bursts of modulation signals is used to improve energy efficiency of dimming control for the lighting system. For example, the other burst of the two separate bursts of modulation signals enables transfer of energy from a capacitor to the output, so that the energy stored on the capacitor is not consumed through the bleeding mechanism that can cause serious heating. In another example, the other burst of the two separate bursts of modulation signals reduces the need for a heat sink for the transistor.

According to another embodiment, the intelligent mechanism can provide to LEDs a current that is symmetric between the positive half cycle and the negative half cycle of an AC input voltage in order to prevent flickering of the LEDs that can be caused by an asymmetric current between the positive half cycle and the negative half cycle of the AC input voltage.

Figure 5:
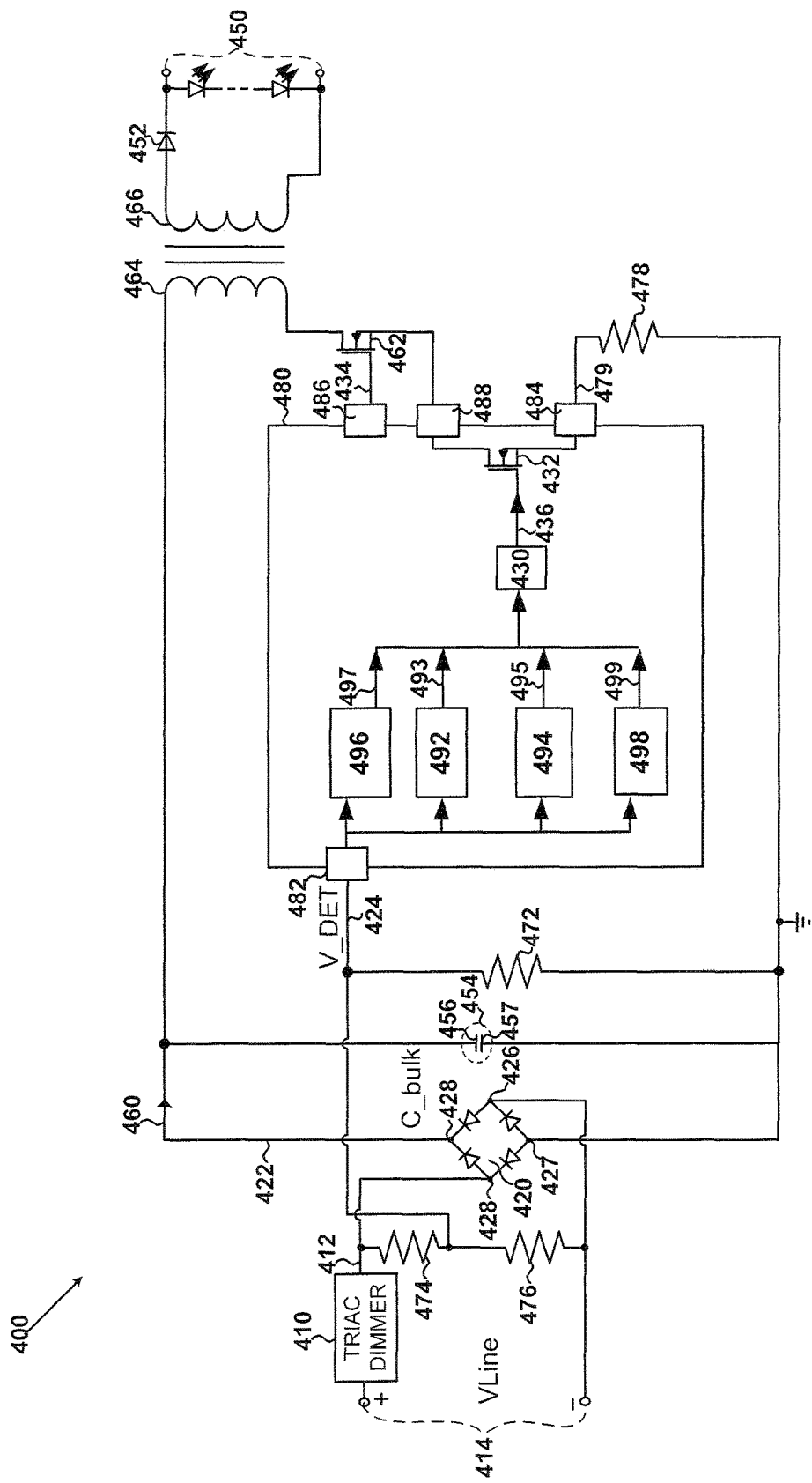
FIG. 5 is a simplified diagram of a lighting system according to an embodiment of the present invention.

FIG. 5 is a simplified diagram of a lighting system according to an embodiment of the present invention. This diagram is merely an example, which should not unduly limit the scope of the claims. One of ordinary skill in the art would recognize many variations, alternatives, and modifications. The lighting system 400 includes a TRIAC dimmer 410, a rectifier 420, one or more LEDs 450, a diode 452, a capacitor 454, a transistor 462, a primary winding 464, a secondary winding 466, resistors 472, 474, 476, and 478, and a system controller 480. Although the above has been shown using a selected group of components for the lighting system 400, there can be many alternatives, modifications, and variations. For example, the TRIAC dimmer 410 is removed from the lighting system 400 so that the lighting system 400 does not include the TRIAC dimmer 410.

As shown in FIG. 5, the TRIAC dimmer 410 receives an AC input voltage 414 (e.g., $V_{line}$) and generates a voltage 412 according to one embodiment. For example, the voltage 412 is received by the resistor 474 and the rectifier 420 (e.g., a full wave rectifying bridge). In another example, the resistors 474 and 476 in response generate a voltage 424. In yet another example, the rectifier 420 (e.g., a full wave rectifying bridge) in response generates a rectified output voltage 422 and a rectified output current 460. According to another embodiment, the rectifier 420 includes diodes that are connected at connection nodes 425, 426, 427 and 428 respectively, and the capacitor 454 includes capacitor plates 456 and 457. For example, the connection node 428 and the capacitor plate 456 are connected. In another example, the connection node 427 and the capacitor plate 457 are biased to the ground voltage.

In one embodiment, the system controller 480 (e.g., a chip) includes terminals 482, 484, 486, and 488 (e.g., pins 482, 484, 486, and 488), processing components 492, 494, 496, and 498, a logic controller and signal generator 430, and a transistor 432. For example, the terminal 482 (e.g., the terminal "V_DET") receives the voltage 424. In another example, the terminal 484 is coupled to the transistor 432 and the resistor 478. In yet another example, the terminal 486 outputs a control signal 434 to a gate terminal of the transistor 462, which also includes a drain terminal and a source terminal. In yet another example, the drain terminal of the transistor 462 is connected to the primary winding 464, and the source terminal of the transistor 462 is connected to the terminal 488.

In another embodiment, the processing components 492, 494, 496, and 498 receive the voltage 424, and generate signals 493, 495, 497, and 499 respectively. For example, the signals 493, 495, 497, and 499 are received by the logic controller and signal generator 430. In another example, the logic controller and signal generator 430 receives the signal 493, the signal 495, the signal 497, and/or the signal 499, processes information associated with the received signal 493, the received signal 495, the received signal 497, and/or the received signal 499, generates a signal 436 based on at least information associated with the received signal 493, the received signal 495, the received signal 497, and/or the received signal 499, and outputs the signal 436 to a gate terminal of the transistor 432.

In yet another example, the transistor 432 also includes a drain terminal and a source terminal. In yet another example, the drain terminal of the transistor 432 is connected to the source terminal of the transistor 462 through the terminal 488, and the source terminal of the transistor 432 is connected to the resistor 478. In yet another example, when the transistors 462 and 432 are both turned on, a current flows from the primary winding to the resistor 478 through the transistor 462, the terminal 488, the transistor 432, and the terminal 484. In yet another example, the current that flows through the resistor 478 generates a voltage 479, which is received by the terminal 484.

In yet another embodiment, the processing component 492 is configured to detect whether or not the TRIAC dimmer 410 is included in the lighting system 400, and if the TRIAC dimmer 410 is detected to be included in the lighting system 400, whether the TRIAC dimmer 410 is a leading-edge TRIAC dimmer or a trailing-edge TRIAC dimmer. For example, the processing component 494 is configured to perform one or more dimming control functions if the TRIAC dimmer 410 is detected to be included in the lighting system 400 and the TRIAC dimmer 410 is a leading-edge TRIAC dimmer. In another example, the processing component 498 is configured to perform one or more dimming control functions if the TRIAC dimmer 410 is detected to be included in the lighting system 400 and the TRIAC dimmer 410 is a trailing-edge TRIAC dimmer. In another example, the processing component 496 is configured to process the voltage 424 that has waveforms not symmetric between a positive half cycle and a negative half cycle of the AC input voltage 414, so that the system controller 480 can provide to the one or more LEDs 450 a current that is symmetric between the positive half cycle and the negative half cycle of the AC input voltage 414.

In yet another embodiment, the following processes (a), (b), and (c) are performed:

(a) The system controller 480 uses the processing component 492 to detect whether or not the TRIAC dimmer 410 is included in the lighting system 400, and if the TRIAC dimmer 410 is detected to be included in the lighting system 400, whether the TRIAC dimmer 410 is a leading-edge TRIAC dimmer or a trailing-edge TRIAC dimmer.

(b) After the process (a) as described above, if the process (a) determines that the TRIAC dimmer 410 is included in the lighting system 400 and the TRIAC dimmer 410 is the leading-edge TRIAC dimmer, the system controller 480 uses the processing components 494 and 496 to perform process (b). For example, during the process (b), the system controller 480 uses the processing component 494 to perform one or more dimming control functions with the leading-edge TRIAC dimmer. In another example, during the process (b), the system controller 480 uses the processing component 496 to process the voltage 424 that has waveforms not symmetric between a positive half cycle and a negative half cycle of the AC input voltage 414, so that the system controller 480 can provide to the one or more LEDs 450 a current that is symmetric between the positive half cycle and the negative half cycle of the AC input voltage 414. In yet another example, when the processing components 494 and 496 are performing the process (b), the logic controller and signal generator 430 generates the signal 436 based on at least information associated with the received signal 495 and the received signal 497 but not based on information associated with the received signal 499. In yet another example, when the processing components 494 and 496 are performing the process (b), the processing component 498 does not function.

(c) After the process (a) as described above, if the process (a) determines the TRIAC dimmer 410 is included in the lighting system 400 and the TRIAC dimmer 410 is the trailing-edge TRIAC dimmer, the system controller 480 uses the processing component 498 to perform process (c). For example, during the process (c), the processing component 498 performs one or more dimming control functions with the trailing-edge TRIAC dimmer. In another example, when the processing component 498 is performing the process (c), the logic controller and signal generator 430 generates the signal 436 based on at least information associated with the received signal 499 but not based on information associated with the received signal 495 and the received signal 497. In yet another example, when the processing component 498 is performing the process (c), the processing components 494 and 496 do not function.

According to certain embodiments, if the process (a) determines the TRIAC dimmer 410 is included in the lighting system 400 and the TRIAC dimmer 410 is the trailing-edge TRIAC dimmer, the processing component 498 receives the voltage 424 and generates the signal 499 based at least in part on the voltage 424, and the logic controller and signal generator 430 receives the signal 499 and generates the signal 436 based at least in part on the received signal 499. For example, if the voltage 424 increases and becomes larger than a reference voltage, a modulation signal (e.g., a pulse-width-modulation signal) is generated as the signal 436 to turn on and off the transistor 432, until the voltage 424 becomes smaller than the reference voltage. In another example, if the voltage 424 becomes smaller than the reference voltage, the signal 436 is kept at the logic low level to turn off the transistor 432 until the voltage 424 becomes larger than the reference voltage again. According to some embodiments, during the processes (a), (b), and (c), the control signal 434 is kept at the logic high level. For example, the control signal 434 is kept at the logic high level, and the transistor 462 is turned on when the transistor 432 is turned on.

As discussed above and further emphasized here, FIG. 5 is merely an example, which should not unduly limit the scope of the claims. One of ordinary skill in the art would recognize many variations, alternatives, and modifications. In one embodiment, the TRIAC dimmer 410 is removed from the lighting system 400, so that the lighting system 400 does not include the TRIAC dimmer 410 and the rectifier 420 directly receives the AC input voltage 414 and generates the rectified output voltage 422 and the rectified output current 460. In another embodiment, one or more components (e.g., one component, two components, or three components) of the processing components 492, 494, 496, and 498 are removed from the system controller 480.

As shown in FIG. 5, immediately after the lighting system 400 is turned on, the system controller 480 uses the processing component 492 to first detect whether or not the TRIAC dimmer 410 is included in the lighting system 400, and if the TRIAC dimmer 410 is detected to be included in the lighting system 400, whether the TRIAC dimmer 410 is a leading-edge TRIAC dimmer or a trailing-edge TRIAC dimmer, according to certain embodiments. For example, the processing component 492 uses the received voltage 424 to detect a rising time period (e.g., T_rise) during which the voltage 424 increases from a lower threshold voltage (e.g., Vth_off) to a higher threshold voltage (e.g., Vth_on) and to detect a falling time period (e.g., T_fall) during which the voltage 424 decreases from the higher threshold voltage (e.g., Vth_on) to the lower threshold voltage (e.g., Vth_off). In another example, the processing component 492 compares the detected rising time (e.g., T_rise) and the detected falling time (e.g., T_fall) to determine whether or not the TRIAC dimmer 410 is included in the lighting system 400, and if the TRIAC dimmer 410 is determined to be included in the lighting system 400, whether the TRIAC dimmer 410 is a leading-edge TRIAC dimmer or a trailing-edge TRIAC dimmer.

Figure 6:
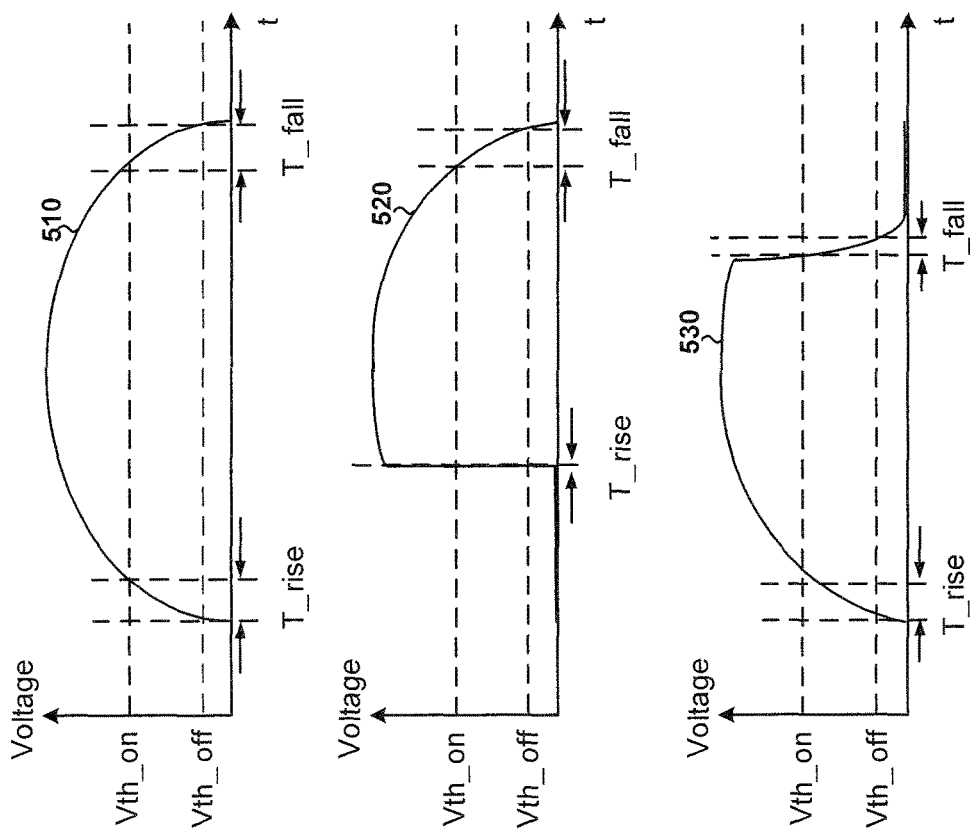
FIG. 6 shows certain timing diagrams for a processing component of the system controller as part of the lighting system as shown in FIG. 5 according to an embodiment of the present invention.

FIG. 6 shows certain timing diagrams for the processing component 492 of the system controller 480 as part of the lighting system 400 as shown in FIG. 5 according to an embodiment of the present invention. These diagrams are merely examples, which should not unduly limit the scope of the claims. One of ordinary skill in the art would recognize many variations, alternatives, and modifications.

In one embodiment, the waveform 510 represents the voltage 424 as a function of time during a half cycle of the AC input voltage 414 (e.g., $V_{line}$) if the lighting system 400 does not include the TRIAC dimmer 410. For example, the lighting system 400 does not include the TRIAC dimmer 410, and the rectifier 420 directly receives the AC input voltage 414 and generates the rectified output voltage 422 and the rectified output current 460. In another embodiment, the waveform 520 represents the voltage 424 as a function of time during a half cycle of the AC input voltage 414 (e.g., $V_{line}$) if the lighting system 400 includes the TRIAC dimmer 410 and the TRIAC dimmer 410 is a leading-edge TRIAC dimmer. In yet another embodiment, the waveform 530 represents the voltage 424 as a function of time during a half cycle of the AC input voltage 414 (e.g., $V_{line}$) if the lighting system 400 includes the TRIAC dimmer 410 and the TRIAC dimmer 410 is a trailing-edge TRIAC dimmer.

According to one embodiment, if the detected rising time (e.g., T_rise) is equal to or approximately equal to the detected falling time (e.g., T_fall), the processing component 492 determines that the TRIAC dimmer 410 is not included in the lighting system 400. According to another embodiment, if the detected rising time (e.g., T_rise) is smaller than the detected falling time (e.g., T_fall), the processing component 492 determines that the TRIAC dimmer 410 is included in the lighting system 400 and the TRIAC dimmer 410 is a leading-edge TRIAC dimmer. For example, for the leading-edge TRIAC dimmer, the voltage 424 increases rapidly so that the detected rising time (e.g., T_rise) is approximately equal to zero. In another example, comparing the detected rising time (e.g., T_rise) and the detected falling time (e.g., T_fall) can reliably detect whether or not the TRIAC dimmer 410 in the lighting system 400 is a leading-edge TRIAC dimmer. According to yet another embodiment, if the detected rising time (e.g., T_rise) is larger than the detected falling time (e.g., T_fall), the processing component 492 determines that the TRIAC dimmer 410 is included in the lighting system 400 and the TRIAC dimmer 410 is a trailing-edge TRIAC dimmer. For example, for the trailing-edge TRIAC dimmer, the voltage 424 decreases slowly due to charging and/or discharging of one or more capacitors so that the detected falling time (e.g., T_fall) is not approximately equal to zero. In another example, comparing the detected rising time (e.g., T_rise) and the detected falling time (e.g., T_fall) can reliably distinguish the situation where the TRIAC dimmer 410 is not included in the lighting system 400 from the situation where the TRIAC dimmer 410 in the lighting system 400 is a trailing-edge TRIAC dimmer.

According to certain embodiments, where $\Delta T$ is a predetermined threshold,
(i) if $|T\_rise - T\_fall| \leq \Delta T$, the processing component 492 determines that the TRIAC dimmer 410 is not included in the lighting system 400;
(ii) if $T\_fall - T\_rise > \Delta T$, the processing component 492 determines that the TRIAC dimmer 410 is included in the lighting system 400 and the TRIAC dimmer 410 is a leading-edge TRIAC dimmer; and
(iii) if $T\_rise - T\_fall > \Delta T$, the processing component 492 determines that the TRIAC dimmer 410 is included in the lighting system 400 and the TRIAC dimmer 410 is a trailing-edge TRIAC dimmer.

In one embodiment, after the processing component 492 has detected that the TRIAC dimmer 410 is included in the lighting system 400 and also determined that the TRIAC dimmer 410 is a leading-edge TRIAC dimmer, the system controller 480 uses the processing component 494 to perform one or more dimming control functions with the leading-edge TRIAC dimmer, and also uses the processing component 496 to process the voltage 424 that has waveforms not symmetric between a positive half cycle and a negative half cycle of the AC input voltage 414 so that the system controller 480 can provide to the one or more LEDs 450 a current that is symmetric between the positive half cycle and the negative half cycle of the AC input voltage 414.

In another embodiment, after the processing component 492 has detected that the TRIAC dimmer 410 is included in the lighting system 400 and also determined that the TRIAC dimmer 410 is a trailing-edge TRIAC dimmer, the system controller 480 uses the processing component 498 to perform one or more dimming control functions with the trailing-edge TRIAC dimmer.

Figure 7:
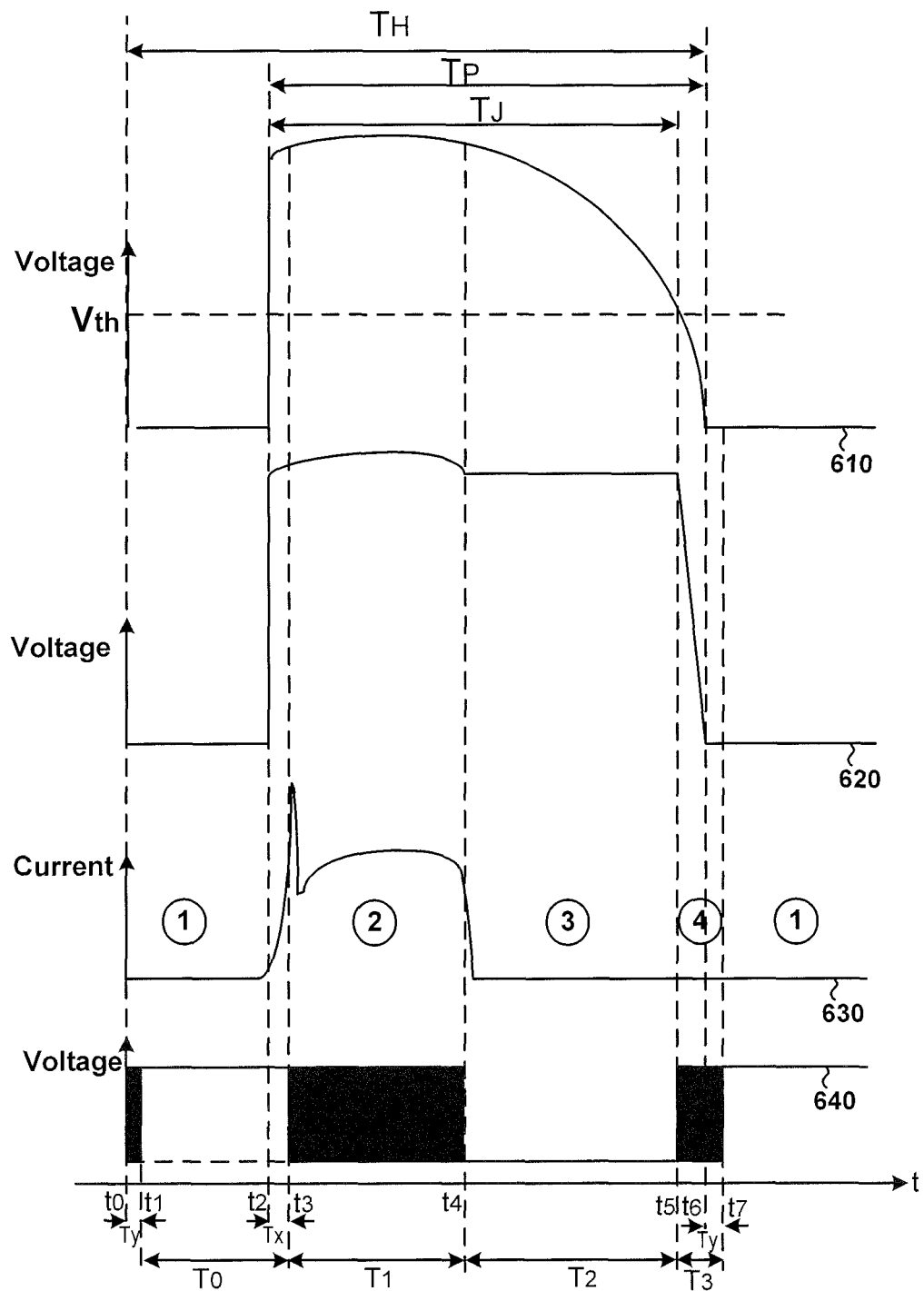
FIG. 7 shows certain timing diagrams for two processing components and the logic controller and signal generator of the system controller as part of the lighting system as shown in FIG. 5 if the TRIAC dimmer is includes in the lighting system and the TRIAC dimmer is a leading-edge TRIAC dimmer according to an embodiment of the present invention.

FIG. 7 shows certain timing diagrams for the processing components 494 and 496 and the logic controller and signal generator 430 of the system controller 480 as part of the lighting system 400 as shown in FIG. 5 if the TRIAC dimmer 410 is includes in the lighting system 400 and the TRIAC dimmer 410 is a leading-edge TRIAC dimmer according to an embodiment of the present invention. These diagrams are merely examples, which should not unduly limit the scope of the claims. One of ordinary skill in the art would recognize many variations, alternatives, and modifications. According to some embodiments, the waveform 610 represents the voltage 424 as a function of time, the waveform 620 represents the voltage 422 as a function of time, the waveform 630 represents the current 460 as a function of time, and the waveform 640 represents the signal 436 as a function of time.

As shown in FIGS. 5 and 7, the processing components 494 and 496 receive the voltage 424, process information associated with the voltage 424, generate the signals 495 and 497 based at least in part on the voltage 424, and output the signals 495 and 497 to the logic controller and signal generator 430 according to certain embodiments. For example, the logic controller and signal generator 430 generates the signal 436 based on at least information associated with the received signal 495 and the received signal 497. In another example, the logic controller and signal generator 430 outputs the signal 436 to the gate terminal of the transistor 432.

As shown in FIG. 7, the time duration from time $t_0$ to time $t_6$ represents a half cycle of the AC input voltage 414 according to certain embodiments. For example, the time duration for the half cycle of the AC input voltage 414 is represented by $T_H$. In another example, during the time duration $T_H$, the voltage 424 has a pulse width $T_P$ from time $t_2$ to time $t_6$, as shown by the waveform 610.

In one embodiment, from time $t_0$ to time $t_1$, the TRIAC dimmer 410 is turned off as shown by the waveform 610 and the signal 436 is a modulation signal (e.g., a pulse-width-modulation signal), which changes between a logic high level and a logic low level as shown by the waveform 640. For example, time $t_1$ is delayed from time $t_0$ by a time duration $T_y$ (e.g., $T_y$ being equal to or larger than zero in magnitude).

In another embodiment, from time $t_1$ to time $t_2$, the TRIAC dimmer 410 is turned off as shown by the waveform 610 and the signal 436 is set at the logic high level as shown by the waveform 640. For example, from time $t_1$ to time $t_2$, the transistor 432 is turned on. In another example, from time $t_1$ to time $t_2$, the TRIAC dimmer 410 is turned off, the voltage 422 is close to the ground voltage, and limited energy is consumed by the transistors 432 and 462.

In yet another embodiment, the processing component 496 detects that the voltage 424 becomes larger than a threshold voltage (e.g., $V_{th}$) at time $t_2$ as shown by the waveform 610, and determines that the TRIAC dimmer 410 becomes turned on at time $t_2$. In yet another example, at time $t_3$, the signal 436 becomes a modulation signal (e.g., a pulse-width-modulation signal) as shown by the waveform 640. For example, time $t_3$ is delayed from time $t_2$ by a time duration $T_x$ (e.g., $T_x$ being equal to or larger than zero in magnitude). In another example, during the time duration $T_x$, the signal 436 remains at the logic high level as shown by the waveform 640. In yet another example, the time duration from time $t_1$ to time $t_3$ is represented by $T_0$.

In yet another example, from time $t_3$ to time $t_4$, the signal 436 is a modulation signal (e.g., a pulse-width-modulation signal), which changes between the logic high level and a logic low level as shown by the waveform 640. For example, the time duration from time $t_3$ to time $t_4$ is equal to $T_1$. In another example, the time duration $T_1$ is determined previously by the processing component 494. In yet another example, from time $t_3$ to time $t_4$, the energy is transferred from the primary winding 464 to the secondary winding 466, which provides the transferred energy to the one or more LEDs 450.

According to one embodiment, at time $t_4$, the signal 436 is set at the logic low level, and from time $t_4$ to time $t_5$, the signal 436 remains at the logic low level as shown by the waveform 640. For example, time $t_5$ represents the time when the processing component 496 determines the decreasing voltage 424 becomes equal to the threshold voltage (e.g., $V_{th}$) as shown by the waveform 610. In another example, the time duration from time $t_4$ to time $t_5$ is equal to $T_2$. In yet another example, during the time duration $T_2$, the transistor 432 remains turned off. In yet another example, during the time duration $T_2$, no sufficient current flows through the TRIAC dimmer 410 and the TRIAC dimmer 410 is turned off, as shown by the waveform 630.

According to another embodiment, the processing component 496 detects that the voltage 424 becomes smaller than the threshold voltage (e.g., $V_{th}$) at time $t_5$ as shown by the waveform 610. For example, at time $t_5$, the signal 436 becomes the modulation signal (e.g., the pulse-width-modulation signal) as shown by the waveform 640.

In one embodiment, from time $t_5$ to time $t_7$, the signal 436 is a modulation signal (e.g., a pulse-width-modulation signal), which changes between the logic high level and the logic low level as shown by the waveform 640. For example, the time duration from time $t_5$ to time $t_7$ is equal to $T_3$. In another example, the time duration $T_3$ is determined previously by the processing component 494. In yet another example, during the time duration $T_3$, the energy is transferred from the capacitor 454 to the secondary winding 466 through the primary winding 464, and the secondary winding 466 provides the transferred energy to the one or more LEDs 450. In yet another example, during the time duration $T_3$, the voltage 422 of the capacitor 454 drops to zero (e.g., at or after time $t_6$ but before time $t_7$) as shown by the waveform 620.

In another embodiment, time $t_7$ is delayed from time $t_6$ by the time duration $T_y$ (e.g., $T_y$ being equal to or larger than zero in magnitude). For example, the time duration $T_y$ is equal to the time duration $T_x$. In another example, the time duration $T_y$ is not equal to the time duration $T_x$. In yet another example, the time duration from time $t_0$ to time $t_7$ is equal to the time duration from time $t_0$ to time $t_1$, and the signal 436 from time $t_0$ to time $t_7$ is the same as the signal 436 from time $t_0$ to time $t_1$.

As shown in FIG. 7, a half cycle of the AC input voltage 414 is represented by a time duration $T_H$ according to one embodiment. For example, the time duration from time $t_0$ to time $t_6$ is equal to the half cycle $T_H$ of the AC input voltage 414. According to another embodiment, a pulse width of the voltage 424 is represented by a time duration $T_P$. For example, the time duration from time $t_2$ to time $t_6$ is equal to the pulse width $T_P$ of the voltage 424.

According to yet another embodiment, as shown by the waveform 610, the voltage 424 becomes larger than the threshold voltage (e.g., $V_{th}$) at time $t_2$ and becomes smaller than the threshold voltage (e.g., $V_{th}$) at time $t_5$. For example, the time duration from time $t_2$ to time $t_5$ is represented by $T_J$. In another example, $$T_J = T_x + T_1 + T_2 \qquad \text{(Equation 1)}$$

where $T_J$ represents the time duration from time $t_2$ to time $t_5$. Additionally, $T_x$ represents the time duration from $t_2$ to $t_3$, $T_1$ represents the time duration from time $t_3$ to time $t_4$, and $T_2$ represents the time duration from $t_4$ to $t_5$.

According to yet another embodiment, the time duration from time $t_6$ to time $t_7$ is equal to the time duration from time $t_0$ to time $t_1$, and the signal 436 from time $t_6$ to time $t_7$ is the same as the signal 436 from time $t_0$ to time $t_1$. For example, at time $t_7$, similar to at time $t_1$, the signal 436 is set at the logic high level. In another example, the signal 436 remains at the logic high level until a later time (e.g., similar to time $t_3$). In yet another example, the later time (e.g., similar to time $t_3$) is delayed, by the time duration $T_x$ (e.g., $T_x$ being equal to or larger than zero in magnitude), from a time (e.g., similar to time $t_2$) when the processing component 496 determines that the TRIAC dimmer 410 becomes turned on.

As shown in FIG. 7, the processing component 496 detects that the voltage 424 becomes larger than the threshold voltage (e.g., $V_{th}$) at time $t_2$ as shown by the waveform 610 according to certain embodiments. For example, after the predetermined delay of the time duration $T_x$ (e.g., $T_x$ being equal to or larger than zero in magnitude), the signal 436 becomes a modulation signal (e.g., a pulse-width-modulation signal) at time $t_3$, as shown by the waveform 640. In another example, during the time duration $T_1$, the signal 436 is a modulation signal (e.g., a pulse-width-modulation signal), which changes between the logic high level and the logic low level as shown by the waveform 640. In yet another example, the time duration $T_1$ is determined previously by the processing component 494.

Also, as shown in FIG. 7, the processing component 496 detects that the voltage 424 becomes smaller than the threshold voltage (e.g., $V_{th}$) at time $t_5$ as shown by the waveform 610 according to some embodiments. For example, at time $t_5$, the signal 436 becomes a modulation signal (e.g., a pulse-width-modulation signal) as shown by the waveform 640. In another example, during the time duration $T_3$, the signal 436 is a modulation signal (e.g., a pulse-width-modulation signal), which changes between the logic high level and the logic low level as shown by the waveform 640. In yet another example, the time duration $T_3$ is determined previously by the processing component 494.

In one embodiment, the processing component 494 previously determines the magnitude of the time duration $T_1$ and the magnitude of the time duration $T_3$. In another embodiment, the processing component 496 determines the beginning time $t_3$ of the time duration $T_1$ for the modulation signal by deciding time $t_2$, and also determines the beginning time $t_5$ of the time duration $T_2$ for the modulation signal by deciding time $t_5$. For example, time $t_3$ is delayed from time $t_2$ by the predetermined time duration $T_x$ (e.g., $T_x$ being equal to or larger than zero in magnitude).

In yet another embodiment, the processing component 496 is configured to process the voltage 424 that has waveforms not symmetric between a positive half cycle and a negative half cycle of the AC input voltage 414, so that the system controller 480 can provide to the one or more LEDs 450 a current that is symmetric between the positive half cycle and the negative half cycle of the AC input voltage 414 according to some embodiments.

As shown in FIG. 7, if a TRIAC dimmer is detected to be included in the lighting system and the TRIAC dimmer is a leading-edge TRIAC dimmer, the processing components 494 and 496 outputs the signals 495 and 497 to the logic controller and signal generator 430, and in response, the logic controller and signal generator 430 generates two separate bursts of modulation signals (e.g., the burst of modulation signal during the time duration $T_1$ as shown by the waveform 640 and the burst of modulation signal during the time duration $T_3$ as shown by the waveform 640) for each half-cycle of the AC input voltage (e.g., the half cycle $T_H$ of the AC input voltage 414 as shown by the waveform 610) according to certain embodiments.

For example, for a specific half-cycle of the AC input voltage (e.g., the half cycle $T_H$ of the AC input voltage 414), the beginning of the burst of modulation signal during the time duration $T_1$ is determined by the processing component 496, and the beginning of the burst of modulation signal during the time duration $T_3$ is also determined by the processing component 496. In another example, the magnitude of the time duration $T_1$ for the burst of modulation signal is previously determined by the processing component 494, and the magnitude of the time duration $T_3$ for the burst of modulation signal is also previously determined by the processing component 494.

As shown in FIG. 7, the processing component 494 detects that the voltage 424 becomes larger than the threshold voltage (e.g., $V_{th}$) at time $t_2$ and detects that the voltage 424 becomes smaller than the threshold voltage (e.g., $V_{th}$) at time $t_5$ as shown by the waveform 610 according to some embodiments. For example, the processing component 494 determines the magnitude of the time duration $T_J$ from time $t_2$ to time $t_5$ for the half cycle of the AC input voltage 414 from time $t_0$ to time $t_6$.

In one embodiment, the processing component 494 previously determines the magnitude of the time duration $T_J$ for a previous half cycle of the AC input voltage 414 that ends at time $t_6$. For example, the time duration $T_J$ for the previous half cycle of the AC input voltage 414 that ends at time $t_6$ is represented by $T_{JQ}$. In another embodiment, the processing component 494 also previously determines the magnitude of the time duration $T_J$ for another previous half cycle of the AC input voltage 414, which immediately proceeds the previous half cycle of the AC input voltage 414 that ends at time $t_6$. For example, the time duration $T_J$ for the another previous half cycle of the AC input voltage 414 is represented by $T_{JV}$. In yet another embodiment, the voltage 424 has waveforms not symmetric between a positive half cycle and a negative half cycle of the AC input voltage 414, and the magnitude of the time duration $T_{JQ}$ is not equal to the magnitude of the time duration $T_{JV}$.

According to one embodiment, the processing component 494 processes information associated with the time duration $T_{JQ}$ and the time duration $T_{JV}$ to determine the magnitude of the time duration $T_1$ and the magnitude of the time duration $T_3$ for the half cycle of the AC input voltage 414 from time $t_0$ to time $t_6$. For example, the processing component 494 compares the time duration $T_{JQ}$ and the time duration $T_{JV}$ and, if the magnitude of the time duration $T_{JQ}$ is not equal to the magnitude of the time duration $T_{JV}$, uses the smaller time duration to determine the magnitude of the time duration $T_1$ and the magnitude of the time duration $T_3$ for the half cycle of the AC input voltage 414 from time $t_0$ to time $t_6$. In another example, the processing component 494 compares the time duration $T_{JQ}$ and the time duration $T_{JV}$ and, if the magnitude of the time duration $T_{JQ}$ is equal to the magnitude of the time duration $T_{JV}$, uses either the time duration $T_{JQ}$ or the time duration $T_{JV}$ to determine the magnitude of the time duration $T_1$ and the magnitude of the time duration $T_3$ for the half cycle of the AC input voltage 414 from time $t_0$ to time $t_6$.

In yet another example, the processing component 494 compares the time duration $T_{JQ}$ and the time duration $T_{JV}$ and uses the larger time duration to determine the magnitude of the time duration $T_1$ and the magnitude of the time duration $T_3$ for the half cycle of the AC input voltage 414 from time $t_0$ to time $t_6$. In yet another example, the processing component 494 calculates the average duration of the time duration $T_{JQ}$ and the time duration $T_{JV}$ and uses the average duration to determine the magnitude of the time duration $T_1$ and the magnitude of the time duration $T_3$ for the half cycle of the AC input voltage 414 from time $t_0$ to time $t_6$.

According to some embodiments, the separate bursts of modulation signals (e.g., the burst of modulation signal during the time duration $T_1$ as shown by the waveform 640 and the burst of modulation signal during the time duration $T_3$ as shown by the waveform 640) are used to improve performance and efficiency of a lighting system (e.g., the lighting system 400). In one embodiment, one burst of the two separate bursts of modulation signals (e.g., the burst of modulation signal during the time duration $T_1$ as shown by the waveform 640) is used to ensure that a transistor (e.g., the transistor 432) is modulated between on and off for a sufficiently long period of time, so that the current flowing through the TRIAC dimmer (e.g., the TRIAC dimmer 410) is not lower than the holding current of the TRIAC dimmer. In another embodiment, the other burst of the two separate bursts of modulation signals (e.g., the burst of modulation signal during the time duration $T_3$ as shown by the waveform 640) is used to improve energy efficiency of dimming control for the lighting system (e.g., the lighting system 400). For example, the other burst of the two separate bursts of modulation signals (e.g., the burst of modulation signal during the time duration $T_3$ as shown by the waveform 640) enables transfer of energy from a capacitor (e.g., the capacitor 454) to the output (e.g., to the one or more LEDs 450. In another example, the other burst of the two separate bursts of modulation signals (e.g., the burst of modulation signal during the time duration $T_3$ as shown by the waveform 640) removes the need for adding any heat sink for the transistor (e.g., the transistor 432).

As discussed above and further emphasized here, FIG. 7 is merely an example, which should not unduly limit the scope of the claims. One of ordinary skill in the art would recognize many variations, alternatives, and modifications. For example, time $t_1$ is the same as time to with the time duration of $T_y$ being equal to zero, time $t_3$ is the same as time $t_2$ with the time duration of $T_x$ being equal to zero, and time $t_7$ is the same as time $t_6$ with the time duration of $T_y$ being equal to zero. In another example, time $t_1$ precedes time $t_0$, and time $t_7$ precedes time $t_6$. In yet another example, the threshold voltage used by the processing component 496 to determine time $t_2$ is not equal to the threshold used by the processing component 496 to determine time $t_5$.

Figure 8:
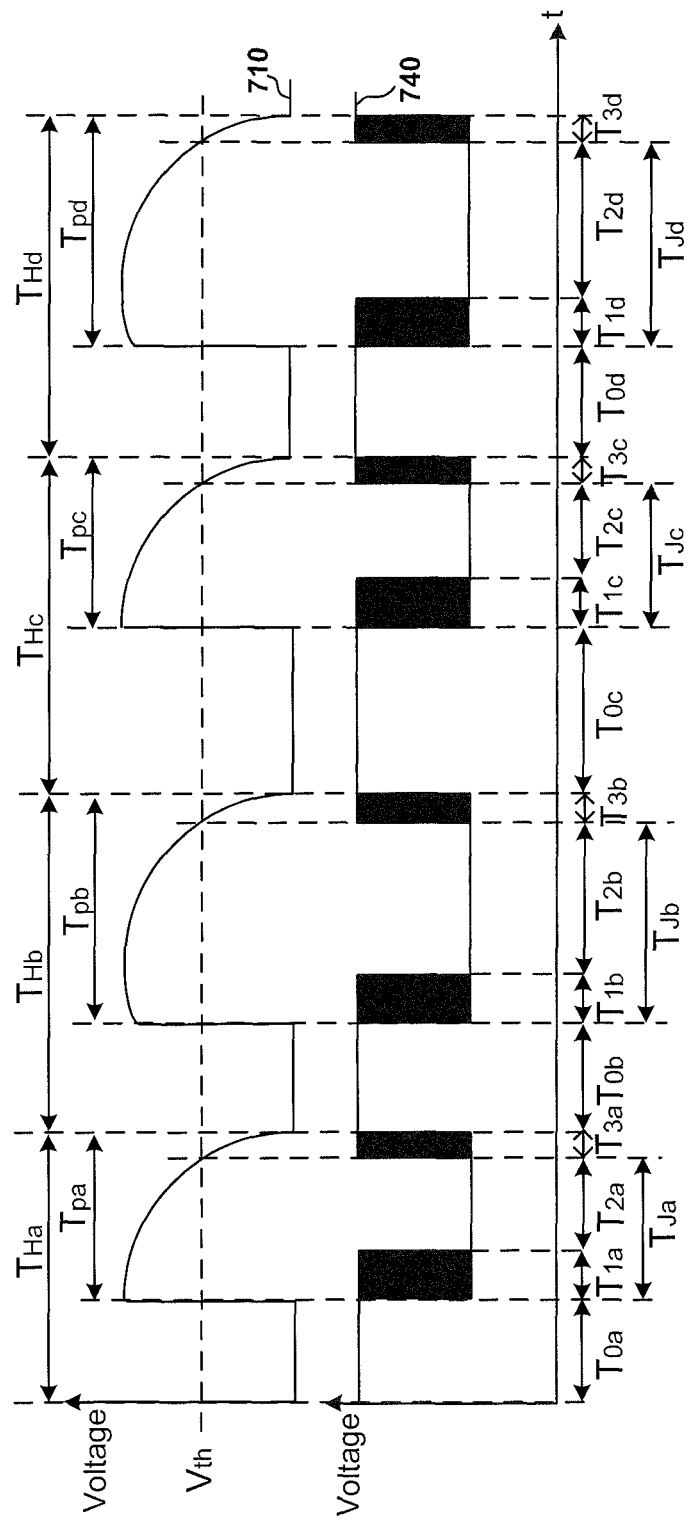
FIG. 8 shows certain timing diagrams for two processing components and the logic controller and signal generator of the system controller as part of the lighting system as shown in FIG. 5 if the TRIAC dimmer is included in the lighting system and the TRIAC dimmer is a leading-edge TRIAC dimmer according to another embodiment of the present invention.

FIG. 8 shows certain timing diagrams for the processing components 494 and 496 and the logic controller and signal generator 430 of the system controller 480 as part of the lighting system 400 as shown in FIG. 5 if the TRIAC dimmer 410 is included in the lighting system 400 and the TRIAC dimmer 410 is a leading-edge TRIAC dimmer according to another embodiment of the present invention. These diagrams are merely examples, which should not unduly limit the scope of the claims. One of ordinary skill in the art would recognize many variations, alternatives, and modifications. Waveform 710 represents the voltage 424 as a function of time, and waveform 740 represents the signal 436 as a function of time.

According to certain embodiments, if the processing component 492 determines that the TRIAC dimmer 410 is included in the lighting system 400 and the TRIAC dimmer 410 is the leading-edge TRIAC dimmer, the logic controller and signal generator 430 receives the signal 495 from the processing component 494, receives the signal 497 from the processing component 496, and generates the signal 436 based on at least information associated with the received signal 495 and the received signal 497.

According to some embodiments, the processing component 496 is configured to work with the processing component 494 through the logic controller and signal generator 430. For example, the processing component 494 performs one or more dimming control functions with the leading-edge TRIAC dimmer as shown in FIG. 7. In another example, the processing component 496 processes the voltage 424 that has waveforms not symmetric between a positive half cycle and a negative half cycle of the AC input voltage 414, so that the system controller 480 can provide to the one or more LEDs 450 a current that is symmetric between the positive half cycle and the negative half cycle of the AC input voltage 414 as shown in FIG. 7.

As shown in FIG. 8, four half cycles of the AC input voltage 414 are represented by $T_{Ha}$, $T_{Hb}$, $T_{Hc}$, and $T_{Hd}$ respectively according to certain embodiments. For example, as shown by the waveform 610, the voltage 424 has a pulse width $T_{Pa}$ during the half cycle $T_{Ha}$ of the AC input voltage 414, has a pulse width $T_{Pb}$ during the half cycle $T_{Hb}$ of the AC input voltage 414, has a pulse width $T_{Pc}$ during the half cycle $T_{Hc}$ of the AC input voltage 414, and has a pulse width $T_{Pd}$ during the half cycle $T_{Hd}$ of the AC input voltage 414. In another example, the pulse width $T_{Pa}$ is equal to the pulse width $T_{Pc}$, and the pulse width $T_{Pb}$ is equal to the pulse width $T_{Pd}$. In yet another example, each pulse width of the pulse width $T_{Pa}$ and the pulse width $T_{Pc}$ is smaller than each pulse width of the pulse width $T_{Pb}$ and the pulse width $T_{Pd}$.

In one embodiment, the voltage 424 during the half cycle $T_{Ha}$ of the AC input voltage 414 as shown by the waveform 710 is similar to the voltage 424 during the half cycle $T_H$ of the AC input voltage 414 as shown by the waveform 610. For example, each of the time duration of $T_x$ and the time duration of $T_y$ is equal to zero. In another embodiment, $T_{Pa}$ represents the pulse width of the voltage 424 during the half cycle $T_{Ha}$ of the AC input voltage 414 as shown by the waveform 710. For example, the pulse width $T_{Pa}$ is similar to the pulse width $T_P$ as shown in FIG. 7.

In yet another embodiment, $T_{0a}$ represents a time duration during which the signal 436 is at a logic high level as shown by the waveform 740, $T_{1a}$ represents a time duration during which the signal 436 is a modulation signal (e.g., a pulse-width-modulation signal) that changes between the logic high level and a logic low level as shown by the waveform 740, $T_{2a}$ represents a time duration during which the signal 436 is at the logic low level as shown by the waveform 740, and $T_{3a}$ represents a time duration during which the signal 436 is a modulation signal (e.g., a pulse-width-modulation signal) that changes between the logic high level and the logic low level as shown by the waveform 740. For example, the time duration $T_{0a}$ is similar to the time duration $T_0$ as shown in FIG. 7, the time duration $T_{1a}$ is similar to the time duration $T_1$ as shown in FIG. 7, the time duration $T_{2a}$ is similar to the time duration $T_2$ as shown in FIG. 7, and the time duration $T_{3a}$ is similar to the time duration $T_3$ as shown in FIG. 7.

According to one embodiment, the processing component 496 determines the beginning time of the time duration $T_{1a}$ for the modulation signal by deciding the time when the voltage 424 becomes larger than the threshold voltage (e.g., $V_{th}$) as shown by the waveform 710, and also determines the beginning time of the time duration $T_{3a}$ for the modulation signal by deciding the time when the voltage 424 becomes smaller than the threshold voltage (e.g., $V_{th}$) as shown by the waveform 710. According to another embodiment, the magnitude of the time duration $T_{1a}$ for the modulation signal and the magnitude of the time duration $T_{3a}$ for the modulation signal are previously determined by the processing component 494.

According to yet another embodiment, during the half cycle $T_{Ha}$ of the AC input voltage 414, the processing component 494 determines a time duration $T_{Ja}$ from the time when the voltage 424 becomes larger than the threshold voltage (e.g., $V_{th}$) to the time when the voltage 424 becomes smaller than the threshold voltage (e.g., $V_{th}$) as shown by the waveform 710. For example, the time duration $T_{Ja}$ is similar to the time duration $T_J$ as shown in FIG. 7. In another example, the time duration $T_{Ja}$ is used by the processing component 494 to determine the time durations of two separate bursts of modulation signals for the half cycle $T_{Hb}$ of the AC input voltage 414, and is also used by the processing component 494 to determine the time durations of two separate bursts of modulation signals for the half cycle $T_{Hc}$ of the AC input voltage 414.

In one embodiment, the voltage 424 during the half cycle $T_{Hb}$ of the AC input voltage 414 as shown by the waveform 710 is similar to the voltage 424 during the half cycle $T_H$ of the AC input voltage 414 as shown by the waveform 610. For example, each of the time duration of $T_x$ and the time duration of $T_y$ is equal to zero. In another embodiment, $T_{Pb}$ represents the pulse width of the voltage 424 during the half cycle $T_{Hb}$ of the AC input voltage 414 as shown by the waveform 710. For example, the pulse width $T_{Pb}$ is similar to the pulse width $T_P$ as shown in FIG. 7.

In yet another embodiment, $T_{0b}$ represents a time duration during which the signal 436 is at a logic high level as shown by the waveform 740, $T_{1b}$ represents a time duration during which the signal 436 is a modulation signal (e.g., a pulse-width-modulation signal) that changes between the logic high level and the logic low level as shown by the waveform 740, $T_{2b}$ represents a time duration during which the signal 436 is at the logic low level as shown by the waveform 740, and $T_{3b}$ represents a time duration during which the signal 436 is a modulation signal (e.g., a pulse-width-modulation signal) that changes between the logic high level and the logic low level as shown by the waveform 740. For example, the time duration $T_{0b}$ is similar to the time duration $T_0$ as shown in FIG. 7, the time duration $T_{1b}$ is similar to the time duration $T_1$ as shown in FIG. 7, the time duration $T_{2b}$ is similar to the time duration $T_2$ as shown in FIG. 7, and the time duration $T_{3b}$ is similar to the time duration $T_3$ as shown in FIG. 7.

According to one embodiment, the processing component 496 determines the beginning time of the time duration $T_{1b}$ for the modulation signal by deciding the time when the voltage 424 becomes larger than the threshold voltage (e.g., $V_{th}$) as shown by the waveform 710, and also determines the beginning time of the time duration $T_{3b}$ for the modulation signal by deciding the time when the voltage 424 becomes smaller than the threshold voltage (e.g., $V_{th}$) as shown by the waveform 710. According to another embodiment, the magnitude of the time duration $T_{1b}$ for the modulation signal and the magnitude of the time duration $T_{3b}$ for the modulation signal are previously determined by the processing component 494.

According to yet another embodiment, during the half cycle $T_{Hb}$ of the AC input voltage 414, the processing component 494 determines a time duration $T_{Jb}$ from the time when the voltage 424 becomes larger than the threshold voltage (e.g., $V_{th}$) to the time when the voltage 424 becomes smaller than the threshold voltage (e.g., $V_{th}$) as shown by the waveform 710. For example, the time duration $T_{Jb}$ is similar to the time duration $T_J$ as shown in FIG. 7. In another example, the time duration $T_{Jb}$ is used by the processing component 494 to determine the time durations of two separate bursts of modulation signals for the half cycle $T_{Hc}$ of the AC input voltage 414, and is also used by the processing component 494 to determine the time durations of two separate bursts of modulation signals for the half cycle $T_{Hd}$ of the AC input voltage 414.

In one embodiment, the voltage 424 during the half cycle $T_{Hc}$ of the AC input voltage 414 as shown by the waveform 710 is similar to the voltage 424 during the half cycle $T_H$ of the AC input voltage 414 as shown by the waveform 610. For example, each of the time duration of $T_x$ and the time duration of $T_y$ is equal to zero. In another embodiment, $T_{Pc}$ represents the pulse width of the voltage 424 during the half cycle $T_{Hc}$ of the AC input voltage 414 as shown by the waveform 710. For example, the pulse width $T_{Pc}$ is similar to the pulse width $T_P$ as shown in FIG. 7.

In yet another embodiment, $T_{0c}$ represents a time duration during which the signal 436 is at a logic high level as shown by the waveform 740, $T_{1c}$ represents a time duration during which the signal 436 is a modulation signal (e.g., a pulse-width-modulation signal) that changes between the logic high level and the logic low level as shown by the waveform 740, $T_{2c}$ represents a time duration during which the signal 436 is at the logic low level as shown by the waveform 740, and $T_{3c}$ represents a time duration during which the signal 436 is a modulation signal (e.g., a pulse-width-modulation signal) that changes between the logic high level and the logic low level as shown by the waveform 740. For example, the time duration $T_{0c}$ is similar to the time duration $T_0$ as shown in FIG. 7, the time duration $T_{1c}$ is similar to the time duration $T_1$ as shown in FIG. 7, the time duration $T_{2c}$ is similar to the time duration $T_2$ as shown in FIG. 7, and the time duration $T_{3c}$ is similar to the time duration $T_3$ as shown in FIG. 7.

According to one embodiment, the processing component 496 determines the beginning time of the time duration $T_{1c}$ for the modulation signal by deciding the time when the voltage 424 becomes larger than the threshold voltage (e.g., $V_{th}$) as shown by the waveform 710, and also determines the beginning time of the time duration $T_{3c}$ for the modulation signal by deciding the time when the voltage 424 becomes smaller than the threshold voltage (e.g., $V_{th}$) as shown by the waveform 710.

According to another embodiment, the magnitude of the time duration $T_{1c}$ for the modulation signal and the magnitude of the time duration $T_{3c}$ for the modulation signal are previously determined by the processing component 494. For example, the processing component 494 compares the time duration $T_{Ja}$ and the time duration $T_{Jb}$ and uses the smaller time duration (e.g., the time duration $T_{Ja}$) to determine the magnitude of the time duration $T_{1c}$ and the magnitude of the time duration $T_{3c}$ for the half cycle $T_{Hc}$ of the AC input voltage 414. In another example, the processing component 494 compares the time duration $T_{Ja}$ and the time duration $T_{Jb}$ and uses the larger time duration (e.g., the time duration $T_{Jb}$) to determine the magnitude of the time duration $T_{1c}$ and the magnitude of the time duration $T_{3c}$ for the half cycle $T_{Hc}$ of the AC input voltage 414. In yet another example, the processing component 494 calculates the average duration of the time duration $T_{Ja}$ and the time duration $T_{Jb}$ and uses the average duration to determine the magnitude of the time duration $T_{1c}$ and the magnitude of the time duration $T_{3c}$ for the half cycle $T_{Hc}$ of the AC input voltage 414.

According to yet another embodiment, during the half cycle $T_{Hc}$ of the AC input voltage 414, the processing component 494 determines a time duration $T_{Jc}$ from the time when the voltage 424 becomes larger than the threshold voltage (e.g., $V_{th}$) to the time when the voltage 424 becomes smaller than the threshold voltage (e.g., $V_{th}$) as shown by the waveform 710. For example, the time duration $T_{Jc}$ is similar to the time duration $T_J$ as shown in FIG. 7. In another example, the time duration $T_{Jc}$ is used by the processing component 494 to determine the time durations of two separate bursts of modulation signals for the half cycle $T_{Hd}$ of the AC input voltage 414, and is also used by the processing component 494 to determine the time durations of two separate bursts of modulation signals for the half cycle of the AC input voltage 414 immediately after the half cycle $T_{Hd}$ of the AC input voltage 414.

In one embodiment, the voltage 424 during the half cycle $T_{Hd}$ of the AC input voltage 414 as shown by the waveform 710 is similar to the voltage 424 during the half cycle $T_H$ of the AC input voltage 414 as shown by the waveform 610. For example, each of the time duration of $T_x$ and the time duration of $T_y$ is equal to zero. In another embodiment, $T_{Pd}$ represents the pulse width of the voltage 424 during the half cycle $T_{Hd}$ of the AC input voltage 414 as shown by the waveform 710. For example, the pulse width $T_{Pd}$ is similar to the pulse width $T_P$ as shown in FIG. 7.

In yet another embodiment, $T_{0d}$ represents a time duration during which the signal 436 is at a logic high level as shown by the waveform 740, $T_{1d}$ represents a time duration during which the signal 436 is a modulation signal (e.g., a pulse-width-modulation signal) that changes between the logic high level and the logic low level as shown by the waveform 740, $T_{2d}$ represents a time duration during which the signal 436 is at the logic low level as shown by the waveform 740, and $T_{3d}$ represents a time duration during which the signal 436 is a modulation signal (e.g., a pulse-width-modulation signal) that changes between the logic high level and the logic low level as shown by the waveform 740. For example, the time duration $T_{0d}$ is similar to the time duration $T_0$ as shown in FIG. 7, the time duration $T_{1d}$ is similar to the time duration $T_1$ as shown in FIG. 7, the time duration $T_{2d}$ is similar to the time duration $T_2$ as shown in FIG. 7, and the time duration $T_{3d}$ is similar to the time duration $T_3$ as shown in FIG. 7.

According to one embodiment, the processing component 496 determines the beginning time of the time duration $T_{1d}$ for the modulation signal by deciding the time when the voltage 424 becomes larger than the threshold voltage (e.g., $V_{th}$) as shown by the waveform 710, and also determines the beginning time of the time duration $T_{3d}$ for the modulation signal by deciding the time when the voltage 424 becomes smaller than the threshold voltage (e.g., $V_{th}$) as shown by the waveform 710.

According to another embodiment, the magnitude of the time duration $T_{1d}$ for the modulation signal and the magnitude of the time duration $T_{3d}$ for the modulation signal are previously determined by the processing component 494. For example, the processing component 494 compares the time duration $T_{Jb}$ and the time duration $T_{Jc}$ and uses the smaller time duration (e.g., the time duration $T_{Jc}$) to determine the magnitude of the time duration $T_{1d}$ and the magnitude of the time duration $T_{3d}$ for the half cycle $T_{Hd}$ of the AC input voltage 414. In another example, the processing component 494 compares the time duration $T_{Jb}$ and the time duration $T_{Jc}$ and uses the larger time duration (e.g., the time duration $T_{Jb}$) to determine the magnitude of the time duration $T_{1d}$ and the magnitude of the time duration $T_{3d}$ for the half cycle $T_{Hd}$ of the AC input voltage 414. In yet another example, the processing component 494 calculates the average duration of the time duration $T_{Jb}$ and the time duration $T_{Jc}$ and uses the average duration to determine the magnitude of the time duration $T_{1d}$ and the magnitude of the time duration $T_{3d}$ for the half cycle $T_{Hd}$ of the AC input voltage 414.

According to yet another embodiment, during the half cycle $T_{Hd}$ of the AC input voltage 414, the processing component 494 determines a time duration $T_{Jd}$ from the time when the voltage 424 becomes larger than the threshold voltage (e.g., $V_{th}$) to the time when the voltage 424 becomes smaller than the threshold voltage (e.g., $V_{th}$) as shown by the waveform 710. For example, the time duration $T_{Jd}$ is similar to the time duration $T_J$ as shown in FIG. 7. In another example, the time duration $T_{Jd}$ is used by the processing component 494 to determine the time durations of two separate bursts of modulation signals for the half cycle of the AC input voltage 414 that immediately follows the half cycle $T_{Hd}$ of the AC input voltage 414, and is also used by the processing component 494 to determine the time durations of two separate bursts of modulation signals for the half cycle of the AC input voltage 414 that immediately follows the half cycle of the AC input voltage 414 immediately after the half cycle $T_{Hd}$ of the AC input voltage 414.

As shown in FIG. 8, the pulse width $T_{Pc}$ is smaller than the pulse width $T_{Pd}$ according to some embodiments. For example, $$T_{Pc}=T_{PS} \quad \text{(Equation 2A)}$$

$$T_{Pd}=T_{PL} \quad \text{(Equation 2B)}$$

$$T_{PL}=T_{PS}+\Delta T_P \quad \text{(Equation 2C)}$$

where $T_{PS}$ represents a small pulse width of the voltage 424, and $T_{PL}$ represents a large pulse width of the voltage 424. Additionally, $\Delta T_P$ represents the difference between the small pulse width and the large pulse width.

In another example, $$T_{1d}=T_{1c} \quad \text{(Equation 3A)}$$

$$T_{3d}=T_{3c} \quad \text{(Equation 3B)}$$

In yet another example, $$T_{2c}=T_{2S} \quad \text{(Equation 4A)}$$

$$T_{2d}=T_{2L} \quad \text{(Equation 4B)}$$

$$T_{2L}=T_{2S}+\Delta T_2 \quad \text{(Equation 4C)}$$

where $T_{2S}$ represents a small gap between two bursts of modulation signals, and $T_{2L}$ represents a large gap between two bursts of modulation signals. Additionally, $\Delta T_2$ represents the difference between the small gap and the large gap.

In yet another example, $$\Delta T_P=\Delta T_2 \quad \text{(Equation 5)}$$

where $\Delta T_P$ represents the difference between the small pulse width and the large pulse width, and $\Delta T_2$ represents the difference between the small gap and the large gap.

In yet another example, $$T_{Hc}=T_{Hd} \quad \text{(Equation 6A)}$$

$$T_{Pc}=T_{Pd}-\Delta T_P \quad \text{(Equation 6B)}$$

$$T_{2c}=T_{2d}+\Delta T_P \quad \text{(Equation 6C)}$$

where $T_{Hc}$ represents a half cycle of the AC input voltage 414, and $T_{Hd}$ represents another half cycle of the AC input voltage 414. Additionally, $T_{Pc}$ represents the pulse width of the voltage 424 during the half cycle $T_{Hc}$ of the AC input voltage 414, and $T_{Pd}$ represents the pulse width of the voltage 424 during the half cycle $T_{Hd}$ of the AC input voltage 414. Moreover, $T_{2c}$ represents a time duration during which the signal 436 is at the logic low level for the half cycle $T_{Hc}$ of the AC input voltage 414, and $T_{2d}$ represents a time duration during which the signal 436 is at the logic low level for the half cycle $T_{Hd}$ of the AC input voltage 414. Also, $\Delta T_P$ represents the difference between the small pulse width and the large pulse width.

As shown in FIG. 8, the half cycle $T_{Ha}$ of the AC input voltage 414, the half cycle $T_{Hb}$ of the AC input voltage 414, the half cycle $T_{Hc}$ of the AC input voltage 414, and the half cycle $T_{Hd}$ of the AC input voltage 414 are equal to each other in time duration according to certain embodiments. In one embodiment, the pulse width $T_{Pa}$ is equal to the pulse width $T_{Pc}$, and the pulse width $T_{Pb}$ is equal to the pulse width $T_{Pd}$. In yet another example, each pulse width of the pulse width $T_{Pa}$ and the pulse width $T_{Pc}$ is smaller than each pulse width of the pulse width $T_{Pb}$ and the pulse width $T_{Pd}$. In another embodiment, the time duration $T_{Ja}$ is equal to the time duration $T_{Jc}$, and the time duration $T_{Jb}$ is equal to the time duration $T_{Jd}$. For example, each time duration of the time duration $T_{Ja}$ and the time duration $T_{Jc}$ is smaller than each time duration of the time duration $T_{Jb}$ and the time duration $T_{Jd}$.

In yet another embodiment, the time duration $T_{1a}$, the time duration $T_{1b}$, the time duration $T_{1c}$, and the time duration $T_{1d}$ are equal to each other. In yet another embodiment, the time duration $T_{3a}$, the time duration $T_{3b}$, the time duration $T_{3c}$, and the time duration $T_{3d}$ are equal to each other. In yet another embodiment, the time duration $T_{2a}$ is equal to the time duration $T_{2c}$, and the time duration $T_{2b}$ is equal to the time duration $T_{2d}$. For example, each time duration of the time duration $T_{2a}$ and the time duration $T_{2c}$ is smaller than each time duration of the time duration $T_{2b}$ and the time duration $T_{2d}$.

As shown in FIG. 8, if a TRIAC dimmer is detected to be included in the lighting system and the TRIAC dimmer is a leading-edge TRIAC dimmer, the intelligent mechanism can provide two separate bursts of modulation signals (e.g., the burst of modulation signal during the time duration $T_{1c}$ as shown by the waveform 740 and the burst of modulation signal during the time duration $T_{3c}$ as shown by the waveform 740) for the voltage 424 with a small pulse width (e.g., the pulse width $T_{Pc}$ during the half cycle $T_{Hc}$ of the AC input voltage 414), and also provide two other separate bursts of modulation signals (e.g., the burst of modulation signal during the time duration $T_{1d}$ as shown by the waveform 740 and the burst of modulation signal during the time duration $T_{3d}$ as shown by the waveform 740) for the voltage 424 with a large pulse width (e.g., the pulse width $T_{Pd}$ during the half cycle $T_{Hd}$ of the AC input voltage 414). For example, one burst of the two separate bursts of modulation signals (e.g., the burst of modulation signal during the time duration $T_{1c}$ as shown by the waveform 740) is the same as one burst of the two other separate bursts of modulation signals (e.g., the burst of modulation signal during the time duration $T_{1d}$ as shown by the waveform 740), and the other burst of the two separate bursts of modulation signals (e.g., the burst of modulation signal during the time duration $T_{3c}$ as shown by the waveform 740) is the same as the other burst of the two other separate bursts of modulation signals (e.g., the burst of modulation signal during the time duration $T_{3d}$ as shown by the waveform 740). In another example, the total burst time duration (e.g., the sum of the time duration $T_{1c}$ and the time duration $T_{3c}$) for a small pulse width (e.g., the pulse width $T_{Pc}$ during the half cycle $T_{Hc}$ of the AC input voltage 414) is the same as the total burst time duration (e.g., the sum of the time duration $T_{1d}$ and the time duration $T_{3d}$) for a large pulse width (e.g., the pulse width $T_{Pd}$ during the half cycle $T_{Hd}$ of the AC input voltage 414). In yet another example, by making the total burst time duration for the small pulse width equal to the total burst time duration for the large pulse width, the energy output during a half cycle of the AC input voltage with the small pulse width (e.g., during the half cycle $T_{Hc}$ of the AC input voltage 414) is the same as the energy output during another half cycle of the AC input voltage with the large pulse width (e.g., during the half cycle $T_{Hc}$ of the AC input voltage 414), so that the current provided to the one or more LEDs (e.g., the one or more LEDs 450) remain balanced between the different half cycles of the AC input voltage, and the one or more LEDs (e.g., the one or more LEDs 450) do not flicker.

As discussed above and further emphasized here, FIG. 8 is merely an example, which should not unduly limit the scope of the claims. One of ordinary skill in the art would recognize many variations, alternatives, and modifications. For example, the time duration of $T_y$ is not equal to zero, and the time duration of $T_x$ is not equal to zero. In another example, the time duration of $T_y$ is not equal to the time duration of $T_x$. In yet another example, the time duration of $T_y$ is equal to the time duration of $T_x$.

In yet another example, the threshold voltage used by the processing component 494 to determine the beginning time of the time duration $T_{Ja}$ is not equal to the threshold voltage used by the processing component 494 to determine the ending time of the time duration $T_{Ja}$. In yet another example, the threshold voltage used by the processing component 494 to determine the beginning time of the time duration $T_{Jb}$ is not equal to the threshold voltage used by the processing component 494 to determine the ending time of the time duration $T_{Jb}$. In yet another example, the threshold voltage used by the processing component 494 to determine the beginning time of the time duration $T_{Jc}$ is not equal to the threshold voltage used by the processing component 494 to determine the ending time of the time duration $T_{Jc}$. In yet another example, the threshold voltage used by the processing component 494 to determine the beginning time of the time duration $T_{Jd}$ is not equal to the threshold voltage used by the processing component 494 to determine the ending time of the time duration $T_{Jd}$.

In yet another example, the ending time of the time duration $T_{3a}$ is the same, later than, or earlier than the ending time of the pulse width $T_{Pa}$. In yet another example, the ending time of the time duration $T_{3b}$ is the same, later than, or earlier than the ending time of the pulse width $T_{Pb}$. In yet another example, the ending time of the time duration $T_{3c}$ is the same, later than, or earlier than the ending time of the pulse width $T_{Pc}$. In yet another example, the ending time of the time duration $T_{3d}$ is the same, later than, or earlier than the ending time of the pulse width $T_{Pd}$.

According to another embodiment, a system controller for a lighting system includes a first controller terminal configured to receive a first signal and a transistor including a first transistor terminal, a second transistor terminal, and a third transistor terminal. Additionally, the system controller includes a second controller terminal coupled to the first transistor terminal, and a third controller terminal coupled to the third transistor terminal. The system controller is configured to determine whether the first signal is associated with a leading-edge TRIAC dimmer based at least in part on the first signal, the leading-edge TRIAC dimmer being configured to receive an AC input voltage associated with at least a first half cycle from a starting time to an ending time. Moreover, the system controller is configured to: in response to the first signal being determined to be associated with the leading-edge TRIAC dimmer, generate a drive signal; and send the drive signal to the second transistor terminal. The system controller is further configured to: keep the drive signal at a first logic level to turn on the transistor from a first time, the first time being the same or after the starting time; in response to determining that the first signal satisfies a first condition, start, at a second time, modulating the drive signal by changing the drive signal between the first logic level and a second logic level to turn on and off the transistor; keep modulating the drive signal for a first predetermined time period from the second time to a third time; stop, at the third time, modulating the drive signal to keep the drive signal at the second logic level to turn off the transistor; in response to determining that the first signal satisfies a second condition, start, at a fourth time, modulating the drive signal by changing the drive signal between the first logic level and the second logic level to turn on and off the transistor, the fourth time being before the ending time; keep modulating the drive signal for a second predetermined time period from the fourth time to a fifth time; and stop, at the fifth time, modulating the drive signal to keep the drive signal at the first logic level to turn on the transistor.

According to yet another embodiment, a system controller for a lighting system includes a first controller terminal configured to receive a first signal and a transistor including a first transistor terminal, a second transistor terminal, and a third transistor terminal. Additionally, the system controller includes a second controller terminal coupled to the first transistor terminal and a third controller terminal coupled to the third transistor terminal. The system controller is configured to determine whether the first signal is associated with a leading-edge TRIAC dimmer based at least in part on the first signal, the leading-edge TRIAC dimmer being configured to receive an AC input voltage associated with at least a first half cycle, a second half cycle, and a third half cycle, the first half cycle immediately preceding the second half cycle, the third half cycle following the first half cycle and the second half cycle. Moreover, the system controller is configured to: in response to the first signal being determined to be associated with the leading-edge TRIAC dimmer, generate a drive signal; and send the drive signal to the second transistor terminal. The system controller is further configured to: within the first half cycle, determine a first time period from a first time when the first signal becomes larger than a first threshold to a second time when the first signal becomes smaller than a second threshold; within the second half cycle, determine a second time period from a third time when the first signal becomes larger than the first threshold to a fourth time when the first signal becomes smaller than the second threshold; and determine a third time period and a fourth time period based at least in part on the first time period and the second time period. The system controller is further configured to: within the third half cycle, in response to determining that the first signal satisfies a first condition, start, at a fifth time, modulating the drive signal by changing the drive signal between a first logic level and a second logic level to turn on and off the transistor; keep modulating the drive signal for the third time period from the fifth time; within the third half cycle, in response to determining that the first signal satisfies a second condition, start, at a sixth time, modulating the drive signal by changing the drive signal between the first logic level and the second logic level to turn on and off the transistor; and keep modulating the drive signal for the fourth time period from the sixth time.

According to yet another embodiment, a method for a lighting system includes receiving a first signal and determining whether the first signal is associated with a leading-edge TRIAC dimmer based at least in part on the first signal, the leading-edge TRIAC dimmer being configured to receive an AC input voltage associated with at least a first half cycle from a starting time to an ending time. Additionally, the method includes: in response to the first signal being determined to be associated with the leading-edge TRIAC dimmer, generating a drive signal; and sending the drive signal to a transistor. The process of in response to the first signal being determined to be associated with the leading-edge TRIAC dimmer, generating a drive signal includes: keeping the drive signal at a first logic level to turn on the transistor from a first time, the first time being the same or after the starting time; in response to determining that the first signal satisfies a first condition, starting, at a second time, modulating the drive signal by changing the drive signal between the first logic level and a second logic level to turn on and off the transistor; keeping modulating the drive signal for a first predetermined time period from the second time to a third time; stopping, at the third time, modulating the drive signal to keep the drive signal at the second logic level to turn off the transistor; in response to determining that the first signal satisfies a second condition, starting, at a fourth time, modulating the drive signal by changing the drive signal between the first logic level and the second logic level to turn on and off the transistor, the fourth time being before the ending time; keeping modulating the drive signal for a second predetermined time period from the fourth time to a fifth time; and stopping, at the fifth time, modulating the drive signal to keep the drive signal at the first logic level to turn on the transistor.

According to yet another embodiment, a method for a lighting system includes receiving a first signal and determining whether the first signal is associated with a leading-edge TRIAC dimmer based at least in part on the first signal, the leading-edge TRIAC dimmer being configured to receive an AC input voltage associated with at least a first half cycle, a second half cycle, and a third half cycle, the first half cycle immediately preceding the second half cycle, the third half cycle following the first half cycle and the second half cycle. Additionally, the method includes: in response to the first signal being determined to be associated with the leading-edge TRIAC dimmer, generating a drive signal; and sending the drive signal to a transistor. The process of in response to the first signal being determined to be associated with the leading-edge TRIAC dimmer, generating a drive signal includes: within the first half cycle, determining a first time period from a first time when the first signal becomes larger than a first threshold to a second time when the first signal becomes smaller than a second threshold; within the second half cycle, determining a second time period from a third time when the first signal becomes larger than the first threshold to a fourth time when the first signal becomes smaller than the second threshold; determining a third time period and a fourth time period based at least in part on the first time period and the second time period; within the third half cycle, in response to determining that the first signal satisfies a first condition, starting, at a fifth time, modulating the drive signal by changing the drive signal between a first logic level and a second logic level to turn on and off the transistor; keeping modulating the drive signal for the third time period from the fifth time; within the third half cycle, in response to determining that the first signal satisfies a second condition, starting, at a sixth time, modulating the drive signal by changing the drive signal between the first logic level and the second logic level to turn on and off the transistor; and keeping modulating the drive signal for the fourth time period from the sixth time.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, various embodiments and/or examples of the present invention can be combined.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A system controller for a lighting system, the system controller comprising:
    a first controller terminal configured to receive a first signal; and
    a second controller terminal coupled to a first switch terminal of a switch, the switch further including a second switch terminal;
    wherein the system controller is configured to:
        in response to the first signal being determined to be associated with a leading-edge TRIAC dimmer, generate a drive signal, the leading-edge TRIAC dimmer being configured to receive an AC input voltage associated with at least a first half cycle from a starting time to an ending time; and
        send the drive signal to the second switch terminal;
    wherein the system controller is further configured to:
        keep the drive signal at a first logic level to turn on the switch from a first time, the first time being the same or after the starting time;
        in response to determining that the first signal satisfies a first condition, start, at a second time, modulating the drive signal by changing the drive signal between the first logic level and a second logic level to turn on and off the switch;
        keep modulating the drive signal for a first predetermined time period from the second time to a third time;
        stop, at the third time, modulating the drive signal to keep the drive signal at the second logic level to turn off the switch;
        in response to determining that the first signal satisfies a second condition, start, at a fourth time, modulating the drive signal by changing the drive signal between the first logic level and the second logic level to turn on and off the switch, the fourth time being before the ending time;
        keep modulating the drive signal for a second predetermined time period from the fourth time to a fifth time; and
        stop, at the fifth time, modulating the drive signal to keep the drive signal at the first logic level to turn on the switch.

2. The system controller of claim 1 wherein the fifth time is the same as the ending time.

3. The system controller of claim 1 wherein the fifth time follows the ending time.

4. The system controller of claim 1 wherein the fifth time precedes the ending time.

5. The system controller of claim 1 is further configured to, in response to determining that the first signal satisfies the first condition at a sixth time, start, at the second time, modulating the drive signal by changing the drive signal between the first logic level and the second logic level to turn on and off the switch, the sixth time being after the first time but before the second time.

6. The system controller of claim 1 wherein, in response to the first signal becoming larger than a first threshold, the first signal is determined to satisfy the first condition.

7. The system controller of claim 6 wherein, in response to the first signal becoming smaller than a second threshold, the first signal is determined to satisfy the second condition.

8. The system controller of claim 7 wherein the first threshold is equal to the second threshold.

9. The system controller of claim 7 wherein the first threshold is not equal to the second threshold.

10. The system controller of claim 1 wherein, in response to the first signal becoming smaller than a threshold, the first signal is determined to satisfy the second condition.

11. The system controller of claim 1 is configured to:
    determine a first time period for the first signal to increase from a first threshold to a second threshold;
    determine a second time period for the first signal to decrease from the second threshold to the first threshold; and
    in response to the second time period minus the first time period being larger than a predetermined positive value, determine the first signal to be associated with the leading-edge TRIAC dimmer.

12. The system controller of claim 11 is configured to:
    in response to the first time period minus the second time period being larger than the predetermined positive value, determine the first signal to be associate with a trailing-edge TRIAC dimmer; and
    in response to an absolute value of the first time period minus the second time period being smaller than the predetermined positive value, determine the first signal not to be associated with any TRIAC dimmer.

13. A system controller for a lighting system, the system controller comprising:
    a first controller terminal configured to receive a first signal; and
    a second controller terminal coupled to a first switch terminal of a switch, the switch further including a second switch terminal;
    wherein the system controller is configured to:
        in response to the first signal being determined to be associated with a leading-edge TRIAC dimmer, generate a drive signal, the leading-edge TRIAC dimmer being configured to receive an AC input voltage associated with at least a first half cycle, a second half cycle, and a third half cycle, the first half cycle immediately preceding the second half cycle, the third half cycle following the first half cycle and the second half cycle; and
        send the drive signal to the second switch terminal;
    wherein the system controller is further configured to:

within the first half cycle, determine a first time period from a first time when the first signal becomes larger than a first threshold to a second time when the first signal becomes smaller than a second threshold;

within the second half cycle, determine a second time period from a third time when the first signal becomes larger than the first threshold to a fourth time when the first signal becomes smaller than the second threshold; and determine a third time period and a fourth time period based at least in part on the first time period and the second time period;

wherein the system controller is further configured to:
within the third half cycle, in response to determining that the first signal satisfies a first condition, start, at a fifth time, modulating the drive signal by changing the drive signal between a first logic level and a second logic level to turn on and off the switch;

keep modulating the drive signal for the third time period from the fifth time;

within the third half cycle, in response to determining that the first signal satisfies a second condition, start, at a sixth time, modulating the drive signal by changing the drive signal between the first logic level and the second logic level to turn on and off the switch; and keep modulating the drive signal for the fourth time period from the sixth time.

14. The system controller of claim 13 is further configured to:
compare the first time period and the second time period;
in response to the first time period and the second time period being equal,
determine the third time period and the fourth time period based at least in part on the first time period; and
in response to the first time period and the second time period not being equal,
select a shorter time period from the first time period and the second time period; and
determine the third time period and the fourth time period based at least in part on the shorter time period.

15. The system controller of claim 13 is further configured to:
compare the first time period and the second time period;
in response to the first time period and the second time period being equal,
determine the third time period and the fourth time period based at least in part on the first time period; and
in response to the first time period and the second time period not being equal,
select a longer time period from the first time period and the second time period; and
determine the third time period and the fourth time period based at least in part on the longer time period.

16. The system controller of claim 13 wherein the first threshold is equal to the second threshold.

17. The system controller of claim 13 wherein the first threshold is not equal to the second threshold.

18. A method for a lighting system, the method comprising:
in response to a first signal being determined to be associated with a leading-edge TRIAC dimmer, generating a drive signal, the leading-edge TRIAC dimmer being configured to receive an AC input voltage associated with at least a first half cycle from a starting time to an ending time; and sending the drive signal to a switch;

wherein the in response to a first signal being determined to be associated with a leading-edge TRIAC dimmer, generating a drive signal includes:
keeping the drive signal at a first logic level to turn on the switch from a first time, the first time being the same or after the starting time;

in response to determining that the first signal satisfies a first condition, starting, at a second time, modulating the drive signal by changing the drive signal between the first logic level and a second logic level to turn on and off the switch;

keeping modulating the drive signal for a first predetermined time period from the second time to a third time;

stopping, at the third time, modulating the drive signal to keep the drive signal at the second logic level to turn off the switch;

in response to determining that the first signal satisfies a second condition, starting, at a fourth time, modulating the drive signal by changing the drive signal between the first logic level and the second logic level to turn on and off the switch, the fourth time being before the ending time;

keeping modulating the drive signal for a second predetermined time period from the fourth time to a fifth time; and stopping, at the fifth time, modulating the drive signal to keep the drive signal at the first logic level to turn on the switch.

19. The method of claim 18 wherein the fifth time is the same as the ending time.

20. The method of claim 18 wherein the fifth time follows the ending time.

21. The method of claim 18 wherein the fifth time precedes the ending time.

22. The method of claim 18 wherein the in response to determining that the first signal satisfies a first condition, starting, at a second time, modulating the drive signal by changing the drive signal between the first logic level and a second logic level to turn on and off the switch includes:
in response to determining that the first signal satisfies the first condition at a sixth time, starting, at the second time, modulating the drive signal by changing the drive signal between the first logic level and the second logic level to turn on and off the switch, the sixth time being after the first time but before the second time.

23. The method of claim 18 wherein, in response the first signal becoming larger than a first threshold, the first signal is determined to satisfy the first condition.

24. The method of claim 23 wherein, in response to the first signal becoming smaller than a second threshold, the first signal is determined to satisfy the second condition.

25. The method of claim 24 wherein the first threshold is equal to the second threshold.

26. The method of claim 24 wherein the first threshold is not equal to the second threshold.

27. The method of claim 18 wherein, in response to the first signal becoming smaller than a threshold, the first signal is determined to satisfy the second condition.

28. The method of claim 18 wherein the determining whether the first signal is associated with a leading-edge TRIAC dimmer based at least in part on the first signal includes:

determining a first time period for the first signal to increase from a first threshold to a second threshold;

determining a second time period for the first signal to decrease from the second threshold to the first threshold; and in response to the second time period minus the first time period being larger than a predetermined positive value, determining the first signal to be associated with the leading-edge TRIAC dimmer.

29. The method of claim 28 wherein the determining whether the first signal is associated with a leading-edge TRIAC dimmer based at least in part on the first signal further includes:

in response to the first time period minus the second time period being larger than the predetermined positive value, determining the first signal to be associate with a trailing-edge TRIAC dimmer; and in response to an absolute value of the first time period minus the second time period being smaller than the predetermined positive value, determining the first signal not to be associated with any TRIAC dimmer.

30. A method for a lighting system, the method comprising:

in response to a first signal being determined to be associated with a leading-edge TRIAC dimmer, generating a drive signal, the leading-edge TRIAC dimmer being configured to receive an AC input voltage associated with at least a first half cycle, a second half cycle, and a third half cycle, the first half cycle immediately preceding the second half cycle, the third half cycle following the first half cycle and the second half cycle; and sending the drive signal to a switch;

wherein the in response to a first signal being determined to be associated with the leading-edge TRIAC dimmer, generating a drive signal includes:

within the first half cycle, determining a first time period from a first time when the first signal becomes larger than a first threshold to a second time when the first signal becomes smaller than a second threshold;

within the second half cycle, determining a second time period from a third time when the first signal becomes larger than the first threshold to a fourth time when the first signal becomes smaller than the second threshold;

determining a third time period and a fourth time period based at least in part on the first time period and the second time period;

within the third half cycle, in response to determining that the first signal satisfies a first condition, starting, at a fifth time, modulating the drive signal by changing the drive signal between a first logic level and a second logic level to turn on and off the switch;

keeping modulating the drive signal for the third time period from the fifth time;

within the third half cycle, in response to determining that the first signal satisfies a second condition, starting, at a sixth time, modulating the drive signal by changing the drive signal between the first logic level and the second logic level to turn on and off the switch; and keeping modulating the drive signal for the fourth time period from the sixth time.

31. The method of claim 30 wherein the determining a third time period and a fourth time period based at least in part on the first time period and the second time period includes:

comparing the first time period and the second time period;

in response to the first time period and the second time period being equal, determining the third time period and the fourth time period based at least in part on the first time period; and in response to the first time period and the second time period not being equal, selecting a shorter time period from the first time period and the second time period; and determining the third time period and the fourth time period based at least in part on the shorter time period.

32. The method of claim 30 wherein the determining a third time period and a fourth time period based at least in part on the first time period and the second time period includes:

comparing the first time period and the second time period;

in response to the first time period and the second time period being equal, determining the third time period and the fourth time period based at least in part on the first time period; and in response to the first time period and the second time period not being equal, selecting a longer time period from the first time period and the second time period; and determining the third time period and the fourth time period based at least in part on the longer time period.

33. The method of claim 30 wherein the first threshold is equal to the second threshold.

34. The method of claim 30 wherein the first threshold is not equal to the second threshold.

* * * * *